(12) United States Patent
Smith et al.

(10) Patent No.: US 11,460,745 B2
(45) Date of Patent: Oct. 4, 2022

(54) DISPLAY WITH TWO THIN FILM TRANSISTOR SUBSTRATES

(71) Applicant: SHARP KABUSHIKI KAISHA, Sakai (JP)

(72) Inventors: Nathan James Smith, Oxford (GB); David James Montgomery, Bampton (GB)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/333,390

(22) Filed: May 28, 2021

(65) Prior Publication Data

US 2021/0389619 A1 Dec. 16, 2021

Related U.S. Application Data

(60) Provisional application No. 63/037,232, filed on Jun. 10, 2020.

(51) Int. Cl.
| | |
|---|---|
| *G02F 1/1368* | (2006.01) |
| *G02F 1/1343* | (2006.01) |
| *G02F 1/133* | (2006.01) |
| *G02F 1/1362* | (2006.01) |

(52) U.S. Cl.
CPC ........ *G02F 1/1368* (2013.01); *G02F 1/13306* (2013.01); *G02F 1/134309* (2013.01); *G02F 1/136209* (2013.01); *G02F 1/136222* (2021.01)

(58) Field of Classification Search
None
See application file for complete search history.

(56) References Cited

U.S. PATENT DOCUMENTS

| | | | | |
|---|---|---|---|---|
| 2008/0316380 A1* | 12/2008 | Ijzerman | .............. | H04N 13/398 348/E13.059 |
| 2009/0244441 A1* | 10/2009 | Nagato | ............... | G02F 1/13475 349/78 |
| 2010/0026920 A1* | 2/2010 | Kim | ....................... | G02B 30/27 349/33 |
| 2012/0013606 A1* | 1/2012 | Tsai | ....................... | G02B 30/27 359/462 |
| 2013/0308067 A1* | 11/2013 | Hashimoto | ............ | G02B 30/31 349/15 |
| 2016/0180786 A1* | 6/2016 | Im | ........................ | G09G 3/3659 345/88 |
| 2017/0255057 A1* | 9/2017 | Qiu | ...................... | G02F 1/13363 |
| 2018/0299726 A1* | 10/2018 | Oka | .................. | G02F 1/133528 |
| 2018/0341132 A1* | 11/2018 | Suzuki | .................. | G02F 1/1347 |
| 2019/0137817 A1* | 5/2019 | Yasui | .................... | G02F 1/1347 |
| 2019/0353944 A1* | 11/2019 | Acreman | .......... | G02F 1/133528 |

* cited by examiner

*Primary Examiner* — Ryan Crockett
(74) *Attorney, Agent, or Firm* — ScienBiziP, P.C.

(57) ABSTRACT

An LCD apparatus includes a first substrate and a second substrate. A first TFT array is deposited on the first substrate. A first array of drive electrodes is also deposited on the first substrate. A second TFT array is deposited on the second substrate. A second array of drive electrodes is deposited on the second substrate. The first TFT array, the second TFT array, the first array of drive electrodes and the second array of drive electrodes are configured to enable pixels or subpixels of the LCD apparatus to modulate light. The first TFT array may at least partially overlap the second TFT array, and the first array of drive electrodes may at least partially overlap the second array of drive electrodes, from an LCD viewing perspective.

26 Claims, 26 Drawing Sheets

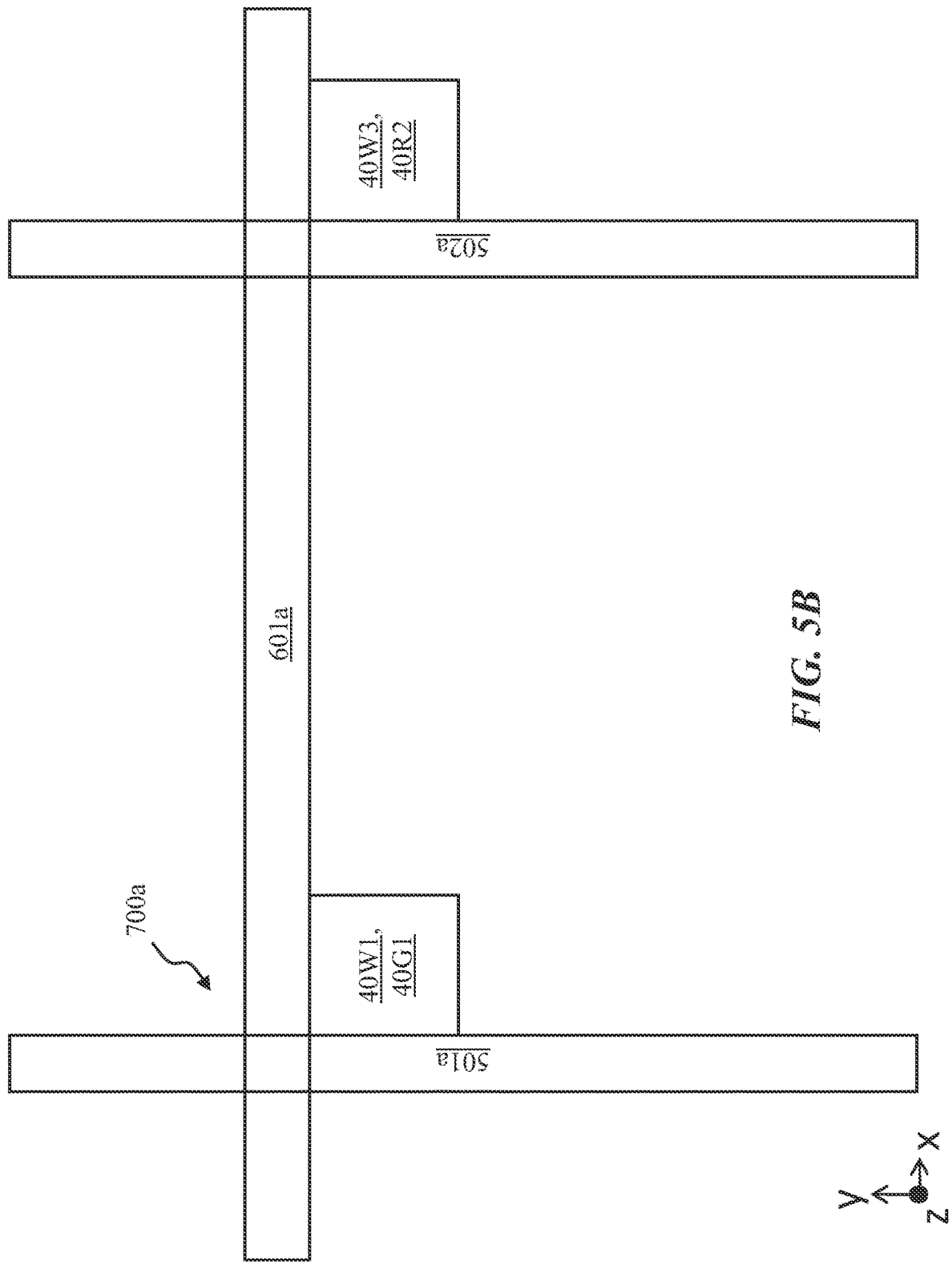

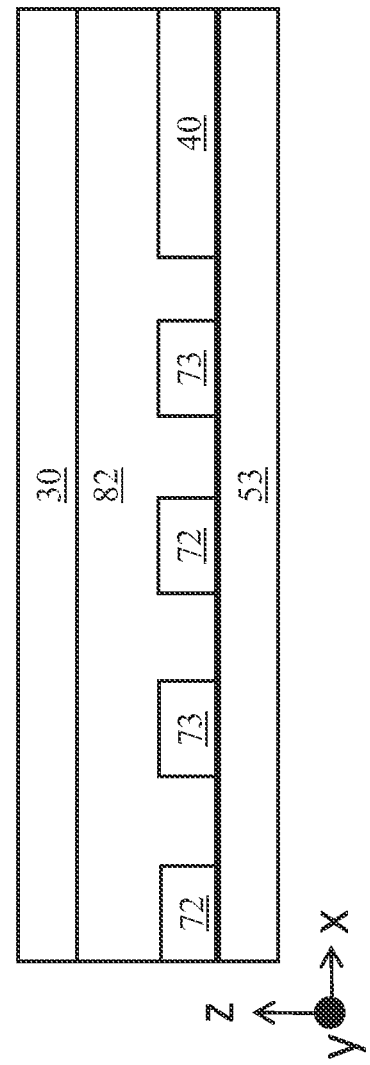
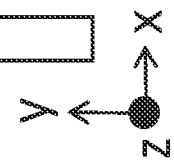
FIG. 8B
FIG. 8C

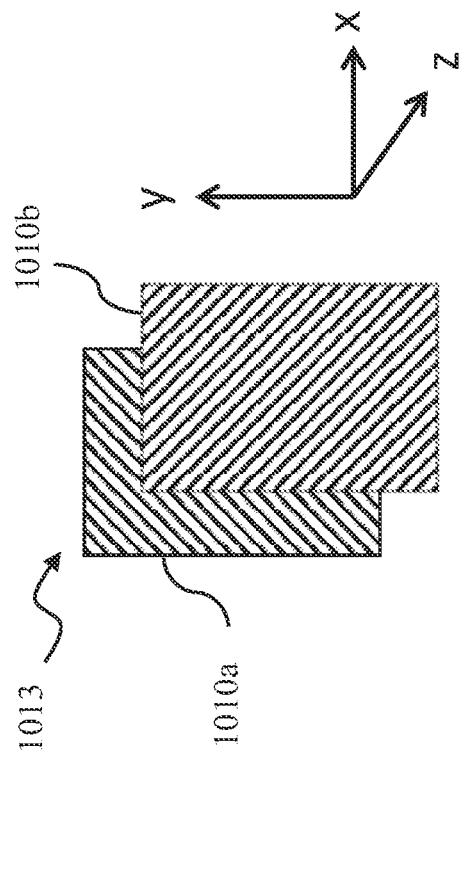
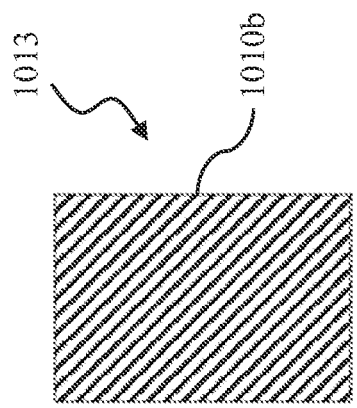
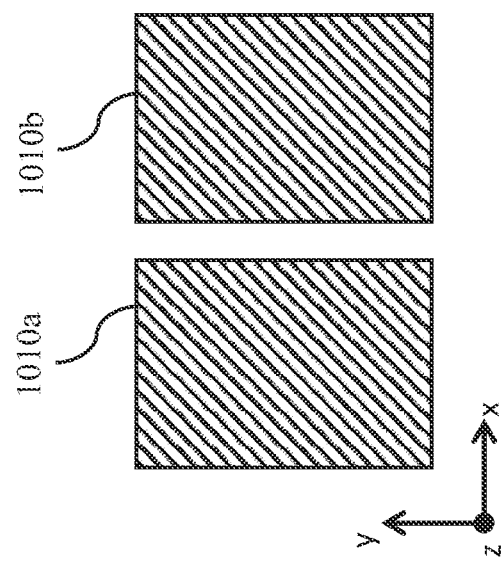
FIG. 10A
FIG. 10B
FIG. 10C

| TFT | 40R1 | 40G1 | 40B1 | 40R2 | 40G2 | 40B2 | 40R3 | 40G3 | 40B3 | 40R4 | 40G4 | 40B4 |
|---|---|---|---|---|---|---|---|---|---|---|---|---|
| Row Electrode Connection | 601b | 601b | 601b | 601b | 601b | 601b | 601a | 601a | 601a | 601a | 601a | 601a |
| Column Electrode Connection | 501b | 501a | 502b | 502a | 503b | 503a | 501a | 501b | 502a | 502b | 503a | 503b |
| TFT | 40R5 | 40G5 | 40B5 | 40R6 | 40G6 | 40B6 | 40R7 | 40G7 | 40B7 | 40R8 | 40G8 | 40B8 |
| Row Electrode Connection | 602b | 602b | 602b | 602b | 602b | 602b | 602a | 602a | 602a | 602a | 602a | 602a |
| Column Electrode Connection | 501b | 501a | 502b | 502a | 503b | 503a | 501a | 501b | 502a | 502b | 503a | 503b |
| TFT | 40R9 | 40G9 | 40B9 | 40R10 | 40G10 | 40B10 | 40R11 | 40G11 | 40B11 | 40R12 | 40G12 | 40B12 |
| Row Electrode Connection | 603b | 603b | 603b | 603b | 603b | 603b | 603a | 603a | 603a | 603a | 603a | 603a |
| Column Electrode Connection | 501b | 501a | 502b | 502a | 503b | 503a | 501a | 501b | 502a | 502b | 503a | 503b |

*FIG. 15E*

| TFT | 40R1 | 40G1 | 40B1 | 40R2 | 40G2 | 40B2 | 40R3 | 40G3 | 40B3 | 40R4 | 40G4 | 40B4 |
|---|---|---|---|---|---|---|---|---|---|---|---|---|
| Row Electrode Connection | 601b | 601b | 601b | 601b | 601b | 601b | 601a | 601a | 601a | 601a | 601a | 601a |
| Column Electrode Connection | 501b | 501a | 502b | 502a | 503b | 503a | 501a | 501b | 502a | 502b | 503a | 503b |
| TFT | 40R5 | 40G5 | 40B5 | 40R6 | 40G6 | 40B6 | 40R7 | 40G7 | 40B7 | 40R8 | 40G8 | 40B8 |
| Row Electrode Connection | 602b | 602b | 602b | 602b | 602b | 602b | 602a | 602a | 602a | 602a | 602a | 602a |
| Column Electrode Connection | 501a | 501b | 502a | 502b | 503a | 503b | 501b | 501a | 502b | 502a | 503b | 503a |
| TFT | 40R9 | 40G9 | 40B9 | 40R10 | 40G10 | 40B10 | 40R11 | 40G11 | 40B11 | 40R12 | 40G12 | 40B12 |
| Row Electrode Connection | 603b | 603b | 603b | 603b | 603b | 603b | 603a | 603a | 603a | 603a | 603a | 603a |
| Column Electrode Connection | 501b | 501a | 502b | 502a | 503b | 503a | 501a | 501b | 502a | 502b | 503a | 503b |

*FIG. 15F*

DISPLAY WITH TWO THIN FILM TRANSISTOR SUBSTRATES

CROSS REFERENCE TO RELATED APPLICATION(S)

The present application claims the benefit of and priority to provisional U.S. Patent Application Ser. No. 63/037,232 filed Jun. 10, 2020, entitled "Display with Two TFT Substrates," (hereinafter referred to as the "SLE19041P application"). The disclosure of the SLE19041P application is hereby incorporated fully by reference into the present application.

FIELD

The present disclosure generally relates to a liquid crystal display (LCD) apparatus having two thin-film transistor (TFT) substrates.

BACKGROUND

Conventional LCDs include, among other elements, a first substrate, a color filter layer, a liquid crystal (LC) layer, a TFT layer (e.g., a TFT array), and a second substrate. Many other elements of conventional LCDs, such as electrodes, LC alignment layers, a backlight, etc., have been omitted from this discussion for clarity.

The color filter layer may include patterned red color filters, patterned green color filters, patterned blue color filters, and patterned black mask. Different color filters may exist, such as yellow color filters or white color filters (e.g., no color filter). The black mask usually surrounds each color filter and is often located above the TFT electronics and/or above the addressing electrodes (e.g., above the source electrodes, above the gate electrodes, etc.). Each color filter is associated with a sub-pixel. A red sub-pixel has an associated TFT, a green sub-pixel has an associated TFT, a blue sub-pixel has an associated TFT, and the red sub-pixel of an adjoining pixel has an associated TFT, etc.

In general, each sub-pixel pertaining to a conventional LCD has at least one associated TFT. In general, each sub-pixel pertaining to a conventional LCD has at least one storage capacitor. The area occupied by a TFT may also contain a storage capacitor for each respective sub-pixel. A plurality of many hundreds or even thousands of sub-pixels extend in both the lateral and longitudinal directions in a conventional LCD.

A red, green, and blue sub-pixel collectively comprise a white pixel, which is typically adjacent another white color pixel. A color filter layer comprised of color filters and black mask may be deposited onto the first substrate. Consequently, the first substrate is often known as the color filter substrate. The TFT layer (e.g., a TFT array) comprised of TFTs and black mask is deposited onto the second substrate. Consequently, the second substrate is often known as the TFT substrate. Typical LCDs have at least one viewing side but may have a first viewing side and a second viewing side. The first substrate may be located on the viewing side of a conventional LCD or the second substrate may be located on the viewing side of said conventional LCD. The first substrate may be located on a first viewing side of a conventional LCD or the second substrate may be located on said first viewing side of said conventional LCD.

A transparent display may have a first viewing side and a second viewing side. Displays with a backlight have just one viewing side. Most conventional non-transparent LCDs have the first substrate deposited on the viewing side and the second substrate deposited on the non-viewing side. Additionally, most conventional non-transparent LCDs have a backlight deposited on the non-viewing side of the second substrate.

Some conventional LCDs includes a first substrate, an LC layer, a second substrate, and a combined array of TFTs and color filters deposited on the second substrate. The combined TFT/color filter layer typically contains patterned color filters and sub-pixels and may also contain a patterned black mask. The advantage of such an LCD over other conventional LCDs is that it may be curved, bent, folded, or flexed without causing unwanted parallax issues between neighboring sub-pixels.

SUMMARY

An LCD apparatus includes a first substrate and a second substrate. A first TFT array may be deposited on the first substrate, and a first array of drive electrodes may also be deposited on the first substrate. A second TFT array may be deposited on the second substrate, and a second array of drive electrodes may also be deposited on the second substrate. The first TFT array, the second TFT array, the first array of drive electrodes, and the second array of drive electrodes may all be configured to enable pixels or sub-pixels of the LCD apparatus to modulate light.

When viewing the LCD apparatus from the orientation of a viewer (e.g., an LCD viewing perspective), the first TFT array may at least partially overlap the second TFT array from the LCD viewing perspective. When viewing the LCD apparatus from the orientation of a viewer, the first array of drive electrodes may at least partially overlap the second array of drive electrodes from the LCD viewing perspective.

To produce a color LCD apparatus, a first color filter array may be deposited on either one of the first substrate and the second substrate. In an alternative implementation, to produce a color LCD apparatus, a first color filter array may be deposited on the first substrate and a second color filter array may be deposited on the second substrate. In another implementation, the first color filter array and the second color filter array may each have at least one color filter selected from the group of color filters consisting of a red color filter, a green color filter, and a blue color filter. In another implementation, at least one color filter of the first color filter array may at least partially overlap at least one color filter of the second color filter array having the same color, from an LCD viewing perspective.

In addition to the first TFT array and the second TFT array, the LCD apparatus may include a patterned black mask array deposited on one of the first substrate and the second substrate. In one implementation, the patterned black mask may be deposited on both the first substrate and the second substrate. In another implementation, the LCD apparatus may have an LC mode configured to be a fringe field switching (FFS) type, an in-plane switching (IPS) type, a vertically aligned (VA) type, a twisted nematic (TN) type, or an LC scattering type.

The LCD apparatus may include pixel electrodes deposited on either (e.g., on one of) the first substrate and the second substrate. In one implementation, the pixel electrodes may be deposited on both the first substrate and the second substrate. In another implementation, the LCD apparatus may include pixel electrodes, with the pixel electrodes being disposed above or below a color filter layer. In another implementation, the LCD apparatus may be configured to be a transmissive LCD, a reflective LCD, a transflective LCD, or a transparent LCD.

In yet another implementation, the first TFT array may be identical to the second TFT array. Similarly, the first array of drive electrodes may be identical to the second array of drive electrodes. At least one of a driver chip and an FPC may be bonded to the first substrate. Similarly, at least one of a driver chip and FPC may be bonded to the second substrate. The first TFT array may be identical to the second TFT array, and the first array of drive electrodes may be identical to the second array of drive electrodes.

In another implementation, at least one electrode of the first array of drive electrodes may be connected to at least one TFT of the first TFT array and at least one TFT of the second TFT array. Additionally, at least one electrode of the second array of drive electrodes may be connected to at least one TFT of the first TFT array and at least one TFT of the second TFT array.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

FIG. 5B illustrates a plan view of components of the novel LCD apparatus with TFTs deposited on two substrates from a viewing direction, in accordance with an example implementation of the present disclosure.

FIG. 8B illustrates a plan view of in-plane switching pixel electrodes, in accordance with an example implementation of the present disclosure.

FIG. 8C illustrates a cross section view of in-plane switching pixel electrodes, in accordance with an example implementation of the present disclosure.

FIG. 10A illustrates a plan view of an identical first substrate and a second substrate, in accordance with an example implementation of the present disclosure.

FIG. 10B illustrates a plan view of the first substrate and the second substrate partially overlapping, in accordance with an example implementation of the present disclosure.

FIG. 10C illustrates a plan view of the first substrate and the second substrate completely overlapping, in accordance with an example implementation of the present disclosure.

FIG. 15E illustrates a table describing the TFT, row, and column connections of a novel LCD, in accordance with an example implementation of the present disclosure.

FIG. 15F illustrates a table describing an alternative TFT, row, and column connections of a novel LCD, in accordance with an example implementation of the present disclosure.

DETAILED DESCRIPTION

Figure 1:
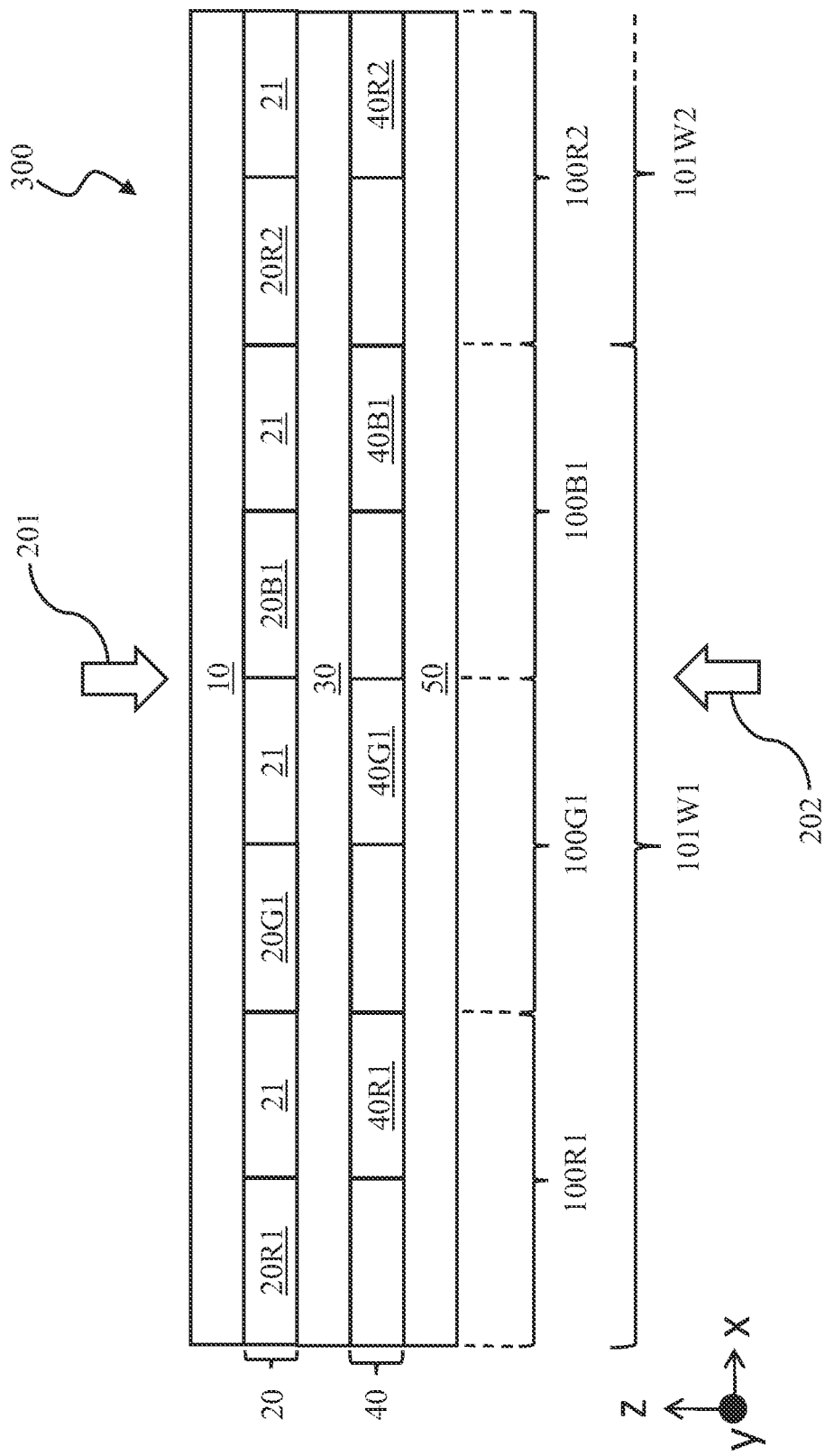
FIG. 1 illustrates components of a conventional LCD apparatus.

The following description contains specific information pertaining to exemplary implementations of the present disclosure. The drawings in the present disclosure and their accompanying detailed description are directed to merely exemplary implementations. However, the present disclosure is not limited to merely these exemplary implementations. Other variations and implementations of the present disclosure will occur to those familiar with the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not shown) by numerals in the exemplary figures. However, the features in different implementations may differ in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates an open-ended inclusion or membership in the so-described combination, group, series, and the equivalent.

Additionally, for purposes of explanation and non-limitation, specific details, such as functional entities, techniques, protocols, standards, and the like are set forth for providing an understanding of the described technology. In other examples, detailed description of well-known methods, technologies, systems, architectures, and the like are omitted so as not to obscure the description with unnecessary details.

FIG. 1 shows components of a conventional liquid crystal display (LCD) 300, including a first substrate 10, a color filter layer 20, a liquid crystal (LC) layer 30, a thin-film transistor (TFT) layer 40, and a second substrate 50. It will be appreciated by one skilled in the art of LCDs that the TFT layer 40 merely denotes the location of the TFT array relative to other components, such as color filter layer 20 and LC layer 30, etc., within the LCD 300. Many elements of the conventional LCD 300, such as electrodes, LC alignment layers, a backlight, etc., have been omitted for clarity. Color filter layer 20 may include patterned red color filters 20R1, 20R2, patterned green color filters 20G1, patterned blue color filters 20B1, and patterned black mask 21. Different color filters not shown in the illustrated view may exist, such as yellow color filters or white color filters (e.g., no color filter).

Each color filter is associated with a sub-pixel 100. A red sub-pixel 100R1 has an associated red TFT 40R1, the green sub-pixel 100G1 has an associated green TFT 40G1, the blue sub-pixel 100B1 has an associated blue TFT 40B1, and the second red sub-pixel 100R2 has an associated second red TFT 40R2. Each black mask 21 usually surrounds each color filter (and is often located above the TFT electronics and/or above the addressing electrodes (e.g., above the source electrodes, above the gate electrodes, etc.).

In general, each sub-pixel (e.g., 100R1, 100G1, 100B1, 100R2, etc.) pertaining to a conventional LCD 300 has at least one associated TFT in the TFT layer 40. In general, each sub-pixel 100 pertaining to a conventional LCD 300 has at least one storage capacitor (not shown). The area occupied by a TFT (e.g., 40R1, 40G1, 40B1, and 40R2) in the TFT layer 40 may also contain a storage capacitor (not shown) for each respective sub-pixel (e.g., 100R1, 100G1, 100B1, 100R2, etc.). Although FIG. 1 only shows four sub-pixels, it will be appreciated that a plurality of many hundreds or even thousands of such sub-pixels extend in both the lateral and longitudinal directions across a conventional LCD 300. The red sub-pixel 100R1, green subpixel 100G1, and blue sub-pixel 100B1 collectively comprise a white pixel 101W1. The second red color sub-pixel 100R2 is associated with an adjacent white color pixel 101W2 with green and blue sub-pixels not shown.

Color filter layer 20 is comprised of color filters (20R1, 20G1, 20B1, and 20R2) and black mask 21 deposited onto the first substrate 10. Consequently, the first substrate 10 is also often known as the "color filter substrate." TFT layer 40 is comprised of TFTs (40R1, 40G1, 40B1, and 40R2) deposited onto the second substrate 50 in an array. Consequently, the second substrate 50 is often known as the "TFT substrate." The LCD 300 has at least a first viewing side 201, although a first viewing side 201 and a second viewing side 202 are shown. In other words, the LCD 300 may be configured to have both a first viewing side 201 and a second viewing side 202. The first substrate 10 may be located on the first viewing side 201 of the conventional LCD 300 or the second substrate 50 may be located on the first viewing side 201 of the conventional LCD 300.

A transparent display may have a first viewing side 201 and a second viewing side 202. Displays with a backlight have just a first viewing side 201. Most conventional non-transparent LCDs 300 have the first substrate 10 deposited on the viewing side 201 and the second substrate 50 deposited on a non-viewing side 202. Most conventional non-transparent LCDs 300 have a backlight (not shown) deposited on the non-viewing side 202 of the second substrate 50.

Figure 2:
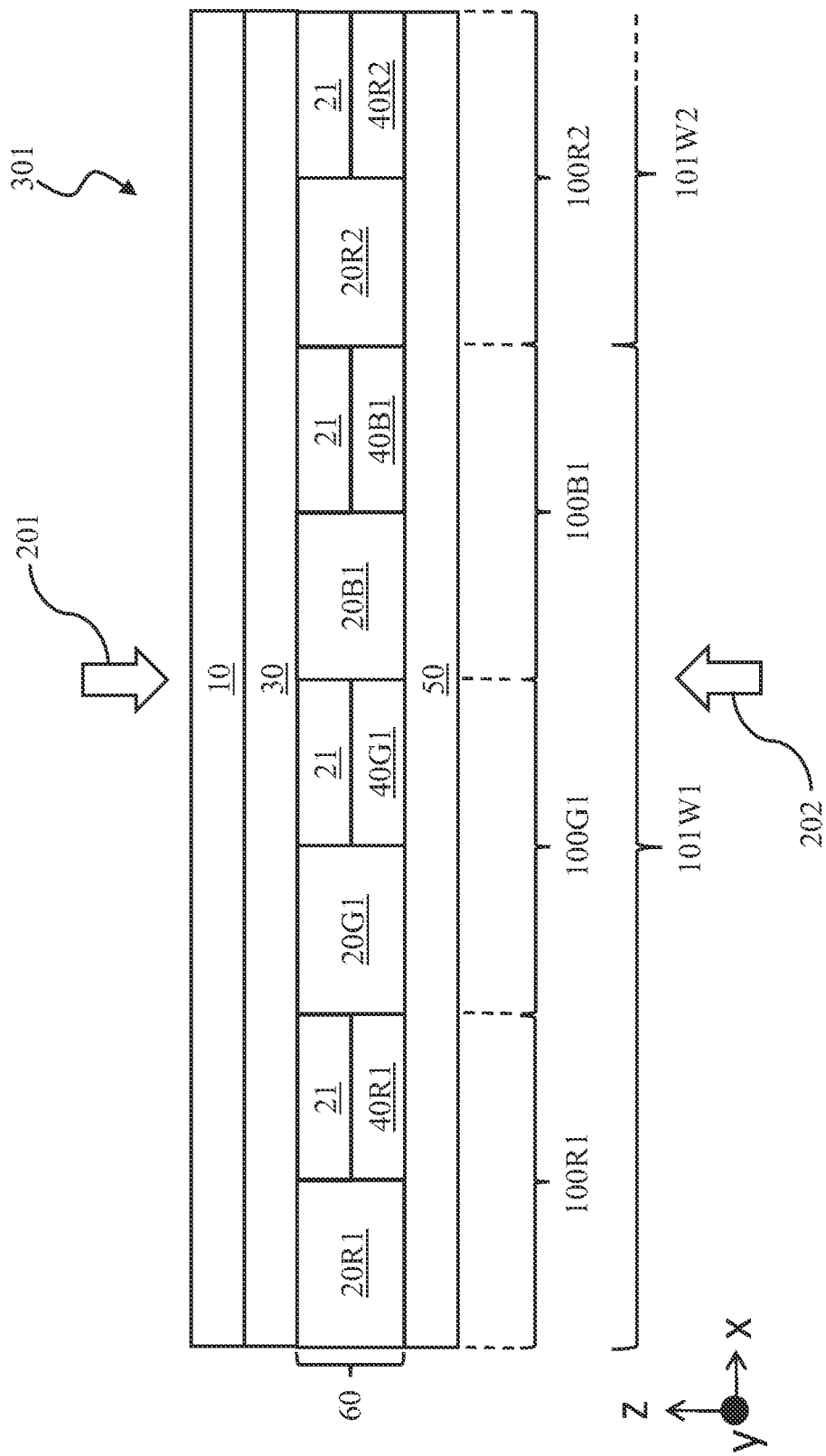
FIG. 2 illustrates components of an alternative conventional LCD apparatus.

FIG. 2 shows components of an alternative conventional LCD 301 that includes a first substrate 10, an LC layer 30, a second substrate 50, and a combined TFT/color filter layer 60 deposited on the second substrate 50. Combined TFT/color filter layer 60 contains patterned color filters (20R1, 20G1, 20B1, and 20R2) and sub-pixels (100R1, 100G1, 100B1, and 100R2) as previously described. Combined TFT/color filter layer 60 may also contain patterned black mask 21. The advantage of the LCD 301 shown in FIG. 2 over the LCD 300 shown in FIG. 1 is that the LCD 301 shown in FIG. 2 may be curved, bent, folded, or flexed without causing unwanted parallax issues between neighboring sub-pixels.

Figure 3:
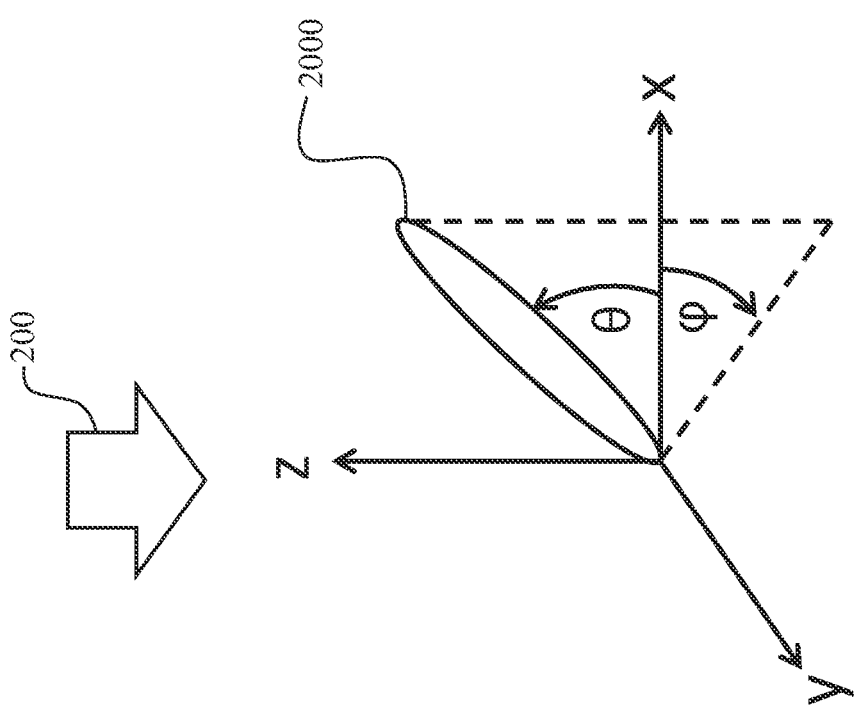
FIG. 3 illustrates a coordinate system for illustrating pertinent terms of orientation as used herein.

FIG. 3, for illustrative purposes, defines a coordinate system for illustrating pertinent terms of orientation used in this disclosure. The axes x, y, and z are orthogonal to each other. The angle between the x-axis and the y-axis is defined as the in-plane angle φ, with the term in-plane more particularly referring to being in the plane of an LCD 300, 301, etc. The angle between the x-axis (or y-axis) and the z-axis is the out-of-plane angle θ relative to the plane of an LCD 300, 301, etc. For reference, an illustrative rod shape 2000 (e.g., of an LC material) is depicted and a viewing direction 200 of viewer along the z-axis are shown.

Figure 4:
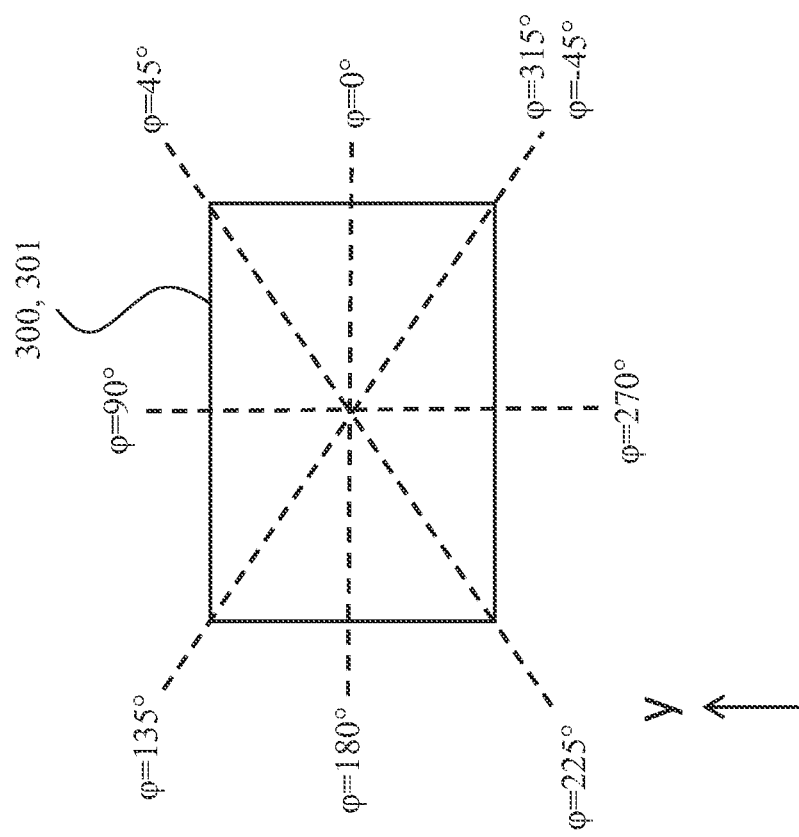
FIG. 4 illustrates a related coordinate system pertaining to an in-plane angle as defined herein.

FIG. 4 shows a related coordinate system pertaining to the in-plane angle φ identified in FIG. 3. Specifically, FIG. 4 shows a range of positioning of the in-plane angle φ with respect to a display apparatus from the perspective of a viewing position relative to a generalized display apparatus.

With reference to figures disclosed herein and conventional art, an LCD includes a first and second substrate on either side of an LC layer. Both the first and second substrate have at least one layer, and often multiple layers, that are deposited on at least one surface of said substrates. Layers are usually deposited in a sequential fashion so that a "lower" layer will generally be deposited before an "upper" layer. An upper layer may be deposited on top of a lower layer.

Figure 5A:
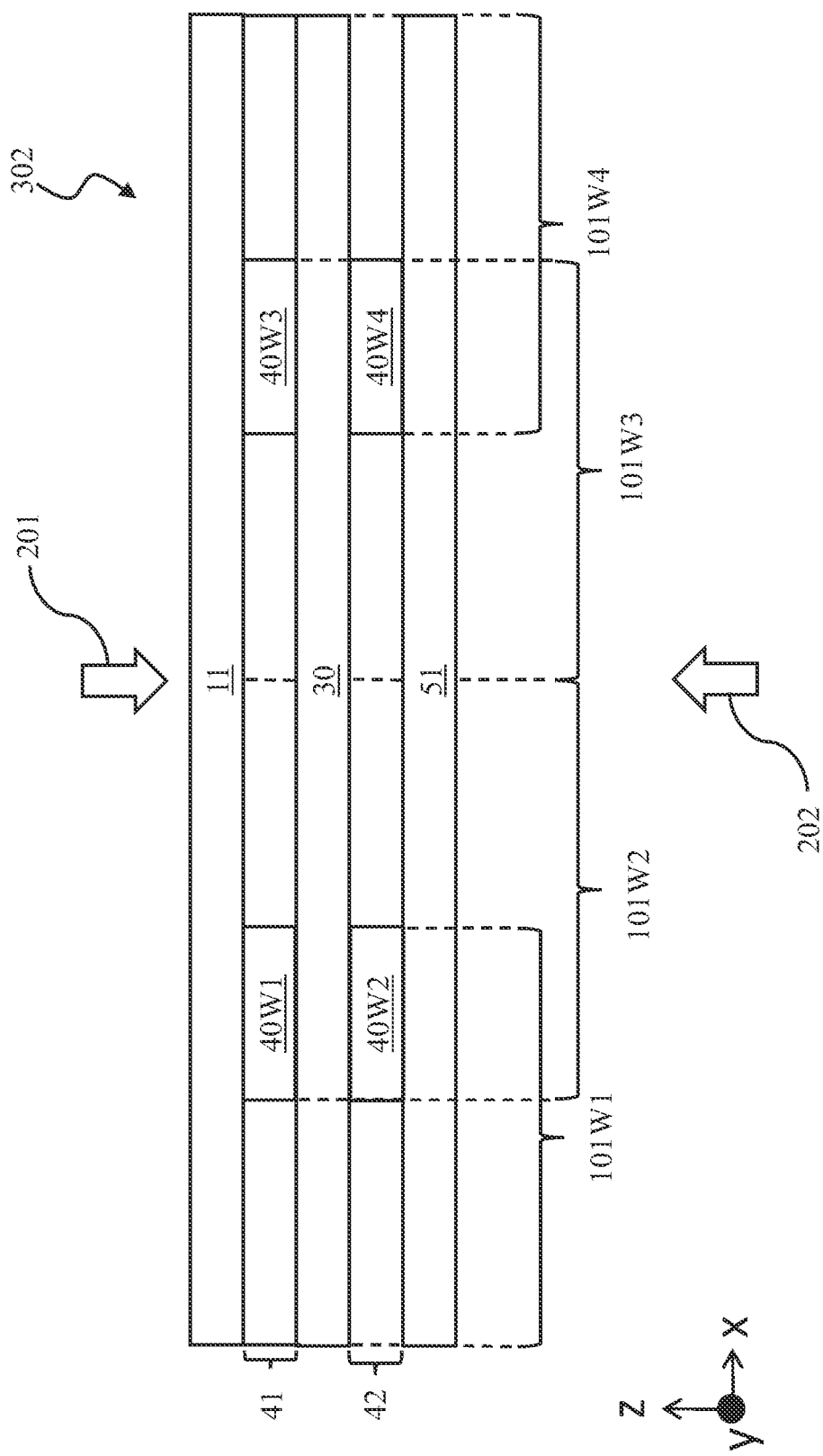
FIG. 5A illustrates a cross section view of components of a novel LCD apparatus with TFTs deposited on two substrates, in accordance with an example implementation of the present disclosure.

FIG. 5A shows a novel LCD 302 including a first substrate 11, a first TFT array 41 deposited on a first substrate 11, an LC layer 30, and a second TFT array 42 deposited on a second substrate 51. Many conventional elements of the novel LCD 302, such as drive electrodes (e.g., row and column electrodes), pixel electrodes, pixel storage capacitors, LC alignment layers, black mask, polarizers, etc., have been omitted for clarity.

A TFT 40W1 is configured with other elements (not shown) to control light modulation in pixel 101W1. A TFT 40W2 is configured with other elements (not shown) to control light modulation in pixel 101W2. A TFT 40W3 is configured with other elements (not shown) to control light modulation in pixel 101W3. A TFT 40W4 is configured with other elements (not shown) to control light modulation in pixel 101W4.

In general, each pixel 100 (e.g., 101W1, 101W2, 101W3 and 101W4) pertaining to the novel LCD 302 has at least one storage capacitor (not shown). The area occupied by a TFT (40W1, 40W2, 40W3, and 40W4) may also contain a storage capacitor (not shown) for each respective pixel (101W1, 101W2, 101W3, and 101W4). The area occupied by a TFT (40W1, 40W2, 40W3, and 40W4) may also contain further non-transparent entities (not shown) that are required for a display. Although FIG. 5A only shows four pixels, it will be appreciated that a plurality of many hundreds or even thousands of pixels and/or sub-pixels extend in both the lateral (x-axis) and longitudinal directions (y-axis) in the novel LCD 302.

FIG. 5B shows a plan view of portions of the novel LCD 302 from the first viewing side 201. The shown TFTs (40W1 and 40W3) are connected to row electrode 601a. TFT 40W1 is connected to column electrode 501a and TFT 40W3 is connected to column electrode 502a. In conventional LCDs, all TFTs are connected to at least one row electrode and at least one column electrode. A first array of row electrode 601a and column electrodes 501a, 502a are deposited on the first substrate 11 (FIG. 5A). The first array of row electrode 601a and column electrodes 501a, 502a may be known collectively as the first array of driving electrodes 700a. Although FIG. 5B only shows one row electrode 601a and two column electrodes 501a, 502a, it will be appreciated that a plurality of many hundreds or even thousands of row and column electrodes may extend in both the lateral (x) and longitudinal (y) directions in the novel LCDs described herein.

Figure 5C:
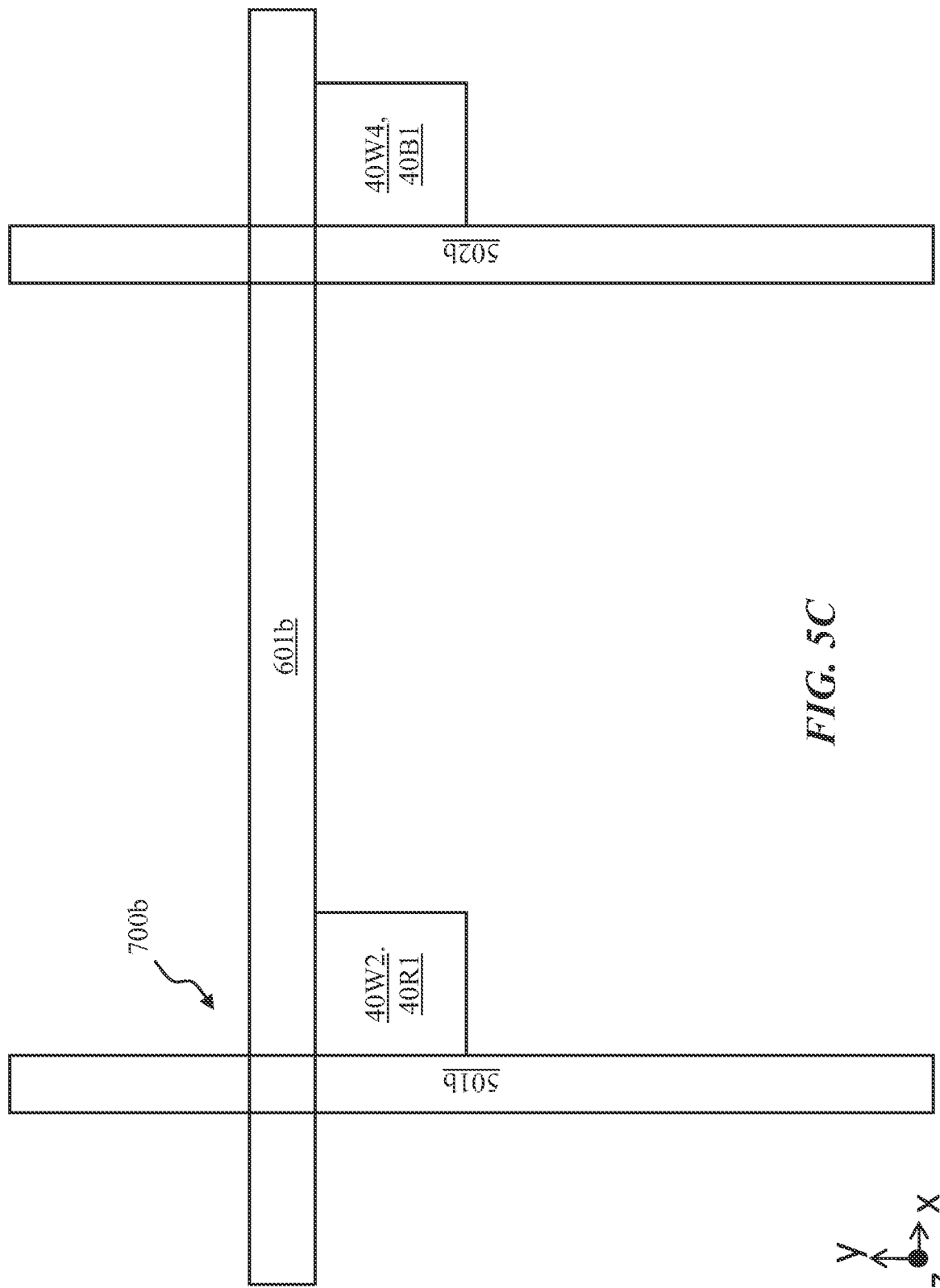
FIG. 5C illustrates a plan view of additional components of the novel LCD apparatus with TFTs deposited on two substrates from a viewing direction, in accordance with an example implementation of the present disclosure.

FIG. 5C shows a plan view of portions of the novel LCD 302 from the second viewing direction 202. The shown TFTs (40W2 and 40W4) are connected to row electrode 601b. TFT 40W2 is connected to column electrode 501b and TFT 40W4 is connected to column electrode 502b. In conventional LCDs, all TFTs are connected to at least one row electrode and at least one column electrode. The second array of row electrode 601b and column electrodes 501b, 502b are deposited on the second substrate 51. The second array of row electrode 601b and column electrodes 501b, 502b may be known collectively as the second array of driving electrodes 700b. Although FIG. 5C only shows one row electrode 601b and two column electrodes 501b, 502b, it will be appreciated that a plurality of many hundreds or even thousands of row and column electrodes extend in both the lateral (x) and longitudinal (y) directions in the novel LCDs described herein.

Figure 5D:
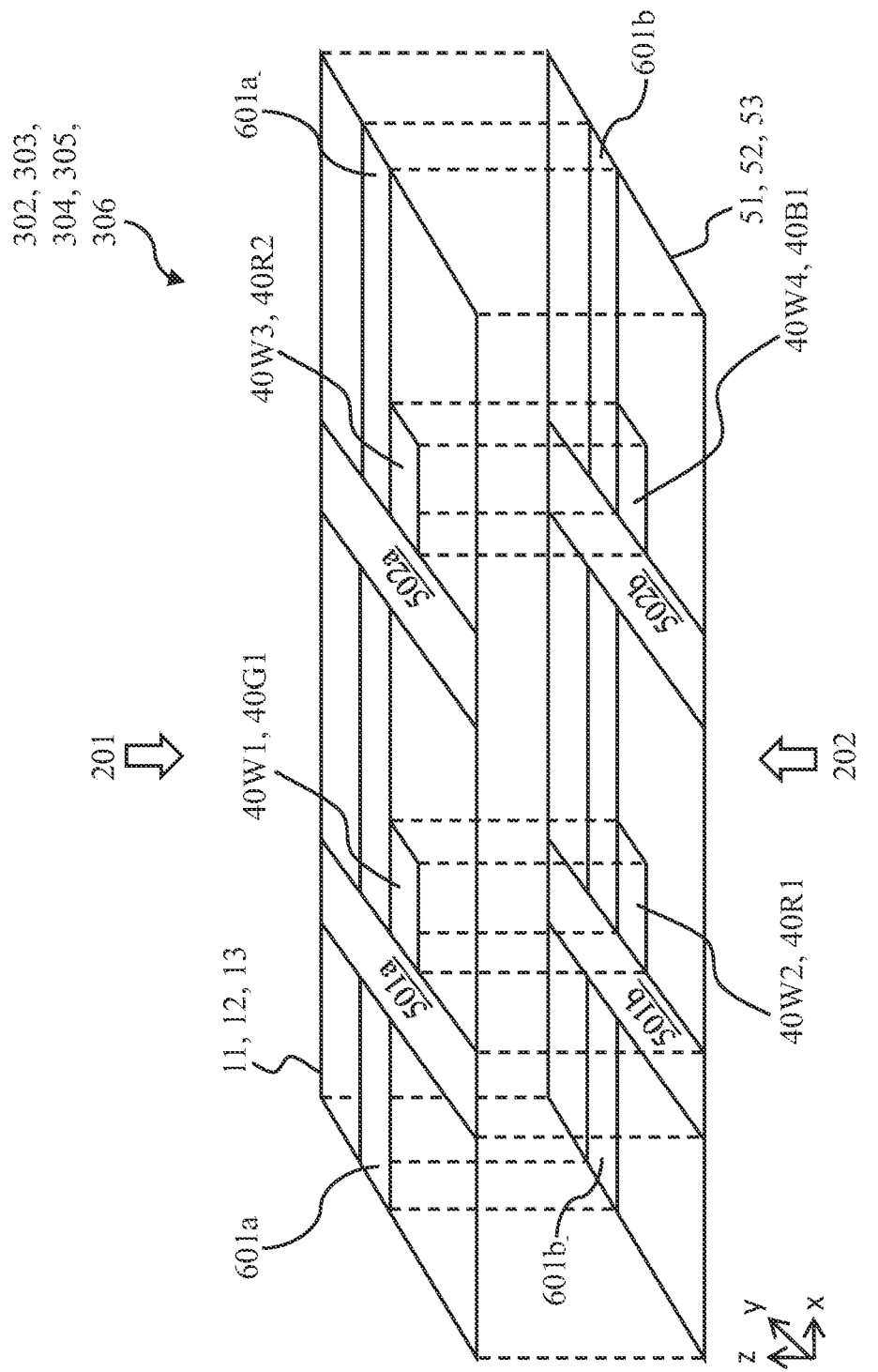
FIG. 5D illustrates a perspective view of components of the novel LCD apparatus with TFTs and drive electrodes deposited on two substrates, in accordance with an example implementation of the present disclosure.

FIG. 5D shows a perspective view of the novel LCD 302. FIG. 5D also contains features common to FIGS. 6, 7, 8A, and 9, discussed below. With reference to FIGS. 5B, 5C, and 5D, row electrodes 601a, 601b may be the source (signal) electrodes and/or the drain electrodes and/or the gate electrodes. Column electrodes 501a, 502a, 501b, and 502b may be the source (signal) electrodes and/or the drain electrodes and/or the gate electrodes. In general, the row and column electrodes, in conjunction with other electronic entities (TFTs, capacitors etc.), supply voltage signals to all individual pixels and/or sub-pixels to generate an image. The term "row electrode" is somewhat arbitrary and may simply pertain to an electrode that is arranged parallel to, or substantially parallel to, a first axis of a coordinate system. The first axis of the coordinate system may be parallel to a first edge of the novel LCD 302. Likewise, the term "column electrode" is also somewhat arbitrary and may simply pertain to an electrode that is arranged parallel to, or substantially parallel to, a second axis of a coordinate system. The second axis of the coordinate system may be parallel to a second edge of the novel LCD 302. The first and second edges of the novel LCD 302 may be perpendicular to each other. The first and second axis may be perpendicular to each other. Alternatively, row electrodes 601a, 601b and/or column electrodes 501a, 502a, 501b, and 502b may have a zigzag design that is similar to the driving electrode design of a conventional LCD 300, 301 (FIGS. 1 and 2). Conventional FFS LCDs may have a zigzag design for either the row electrode and/or the column electrode to increase pixel aperture ratio that is conventional in the art. In a zigzag design for driving electrodes, the average direction vector of the zigzag may be parallel to an edge of the novel LCD 302.

Referring to FIGS. 5B, 5C, and 5D, the novel LCD 302 may have a first array of driving electrodes 700a including row electrodes (including row electrode 601a) propagating in a first direction across the first substrate 11, and column electrodes (including column electrodes 501a and 502a) propagating in a second direction across the first substrate 11. In general, these row electrodes (601a, etc.) and column electrodes (501a, 502a, etc.) comprising the first array of drive electrodes 700a are conventional, or substantially conventional, and form a grid (e.g., a two-dimensional array) across the first substrate 11 that connects the TFTs to driver electronics (not shown).

The first and second directions of the first array of drive electrodes 700a may be arranged perpendicular or substantially perpendicular. The first and second directions of the first array of drive electrodes 700a may be arranged in a conventional or substantially conventional fashion. Voltages may be applied to the row and column electrodes (601a, 501a, 502a, etc.) of the first array of drive electrodes 700a in a conventional manner so that each TFT (e.g., 40W1, 40W3, etc.), in combination with other elements, controls light modulation in an associated pixel or sub-pixel. Said other elements for controlling light modulation may be conventional elements and may include a backlight, polarizer(s), etc. that are not shown but are known to those familiar with LCDs.

Referring to FIGS. 5B, 5C, and 5D, the novel LCD 302 may have a second array of driving electrodes 700b including row electrodes (e.g., row electrode 601b) propagating in a first direction across the second substrate 51 and column electrodes (e.g., column electrodes 501b and 502b) propagating in a second direction across the second substrate 51. In general, these row electrodes (601b, etc.) and column electrodes (501b, 502b, etc.) comprising the second array of drive electrodes 700b are conventional, or substantially conventional, and form a grid (e.g., a two-dimensional array) across the second substrate 51 that connects the TFTs to driver electronics (not shown).

The first and second directions of the second array of drive electrodes 700b may be arranged perpendicular or substantially perpendicular. The first and second directions of the second array of drive electrodes 700b may be arranged in a conventional or substantially conventional fashion. Voltages may be applied to the row and column electrodes of the second array of drive electrodes 700b in a conventional manner so that each TFT (e.g., 40W2, 40W4, etc.), in combination with other elements, controls light modulation in an associated pixel or sub-pixel. Said other elements for controlling light modulation may be conventional elements and may include a backlight, polarizer(s), etc. that are not shown but are known those familiar with LCDs.

Referring to FIGS. 5A, 5B, 5C, and 5D, first TFT array 41 and second TFT array 42 are aligned in both a lateral position (x-direction) and a longitudinal position (y-direction) so that the TFTs (40W1, 40W3, etc.) of the first TFT array 41 overlap with the TFTs (40W2, 40W4, etc.) of the second TFT array 42 from the perspective of the first viewing side 201. In other words, the spatial positioning (x, y) of first TFT array 41 and second TFT array 42 are the same or substantially the same. It may be preferable that the spatial positioning (x, y) of first TFT array 41 and second TFT array 42 are exactly the same. However, the spatial positioning (x, y) of first TFT array 41 and second TFT array 42 may be substantially the same (e.g., not exactly the same) because of manufacturing tolerances. Consequently, and with reference to FIGS. 5B and 5D, only the TFTs (40W1, 40W3, etc.) pertaining to first TFT array 41 are visible from the first viewing side 201. In other words, TFT 40W1 obscures TFT 40W2 because TFT 40W1 is directly above (e.g., completely overlaps) TFT 40W2 from the first viewing side 201. In reality, the degree to which TFT 40W1 obscures TFT 40W2 from the first viewing side 201 may depend on manufacturing tolerances. Likewise, TFT 40W3 obscures TFT 40W4 in the first viewing side 201. First TFT array 41 and second TFT array 42 are physically separated in a viewing direction (e.g., physically separated in the z-direction). In reality, the degree to which TFT 40W3 obscures TFT 40W4 from the first viewing side 201 may depend on manufacturing tolerances.

Referring to FIGS. 5B and 5D, the first array of drive electrodes 700a are aligned in a lateral position (x-direction) and a longitudinal position (y-direction) so that the first array of drive electrodes 700a overlaps the second array of drive electrodes 700b. In other words, the spatial positioning (x, y) of the first array of drive electrodes 700a and the second array of drive electrodes 700b are the same or substantially the same. It may be preferable that the spatial positioning (x, y) of the first array of drive electrodes 700a and second array of drive electrodes 700b are exactly the same. However, the spatial positioning (x, y) of first array of drive electrodes 700a and the second array of drive electrodes 700b may be substantially the same (e.g., not exactly the same) because of manufacturing tolerances. Consequently, and with reference to FIGS. 5B and 5D, only the first array of drive electrodes 700a are visible from the first viewing side 201. In other words, the first array of drive electrodes 700a obscures the second array of drive electrodes 700b because the first array of drive electrodes 700a are directly above (e.g., completely overlaps) the second array of drive electrodes 700b in the first viewing side 201. In reality, the degree to which the first array of drive electrodes 700a obscures the second array of drive electrodes 700b from the first viewing side 201 may depend on manufacturing tolerances. Likewise, and with reference to FIGS. 5C and 5D, only the second array of drive electrodes 700b are visible from the second viewing direction 202. The first array of drive electrodes 700a and the second array of drive electrodes 700b are physically separated in a viewing direction (e.g., in the z-direction. In reality, the degree to which the second array of drive electrodes 700b obscures the first array of drive electrodes 700a from viewing direction 202 may depend on manufacturing tolerances.

As shown in FIG. 5A, first TFT array 41 is disposed on the first substrate 11. Although not shown in FIG. 5A, the first array of drive electrodes 700a is disposed on the first substrate 11. Second TFT array 42 is disposed on the second substrate 51. Although not shown in FIG. 5A, the second array of drive electrodes 700b is disposed on the second substrate 51. In general, first TFT array 41 may at least partially overlap second TFT array 42 from a viewing side perspective. In general, the first array of drive electrodes 700a may at least partially overlap the second array of drive electrodes 700b from a viewing side perspective.

Referring to FIGS. 1 and 2, all sub-pixels (100R1, 100G1, 100B1, and 100R2) and pixels (101W1, 101W2, etc.) have different spatial locations in the LCD 300 in terms of their x and y coordinates. In contrast, and with reference to FIGS. 5A and 5D, some pixels (101W1, 101W2, 101W3, and 101W4) have the same spatial location in the LCD 302 in terms of their x and y coordinates. With reference to FIGS. 5A and 5D, a region of pixel 101W1 shares the same spatial location (e.g., x and y coordinates) as a region of pixel 101W2. Consequently, pixels 101W1 and pixel 101W2 partially overlap from a viewing side perspective. Likewise, pixels 101W3 and pixel 101W4 partially overlap from a viewing side perspective.

First TFT array 41, the first array of drive electrodes 700a, second TFT array 42 and the second array of drive electrodes 700b are configured in conjunction with other conventional elements (many of which are not shown) to modulate the transmission and/or reflection of light through pixels and/or sub-pixels of the LCD 302. The way the light modulation occurs in the LCD 302 may be conventional.

Consequently, details of the additional conventional elements required for light modulation in the LCD 302, such as driver chips, look-up tables, polarizers, etc., have been omitted for clarity. In at least some implementations, the first substrate 11 with first TFT array 41 and the first array of drive electrodes 700a have an overlapping configuration from a viewing side perspective with second TFT array 42 and the second array of drive electrodes 700b of the second substrate 51.

Referring to FIGS. 5A, 5B, 5C and 5D, a patterned array of black mask material (not shown) may be deposited on the first substrate 11 and/or the second substrate 51. The black mask usually surrounds each color filter and is often located above and/or below the TFT electronics. The black mask is often located above and/or below the addressing electrodes (e.g., above and/or below the row electrodes and the column electrodes).

The novel LCD 302 shown in FIG. 5A may be part of a transmissive display, reflective display, transflective display, or transparent display. To create a reflective display or transflective display, additional reflective layers (not shown) must be incorporated between the first substrate 11 and second substrate 51. With reference to FIG. 5A, the first substrate 11 may be located on the first viewing side 201 of the novel LCD 302, or the second substrate 51 may be located on the first viewing side 201 of the novel LCD 302. A transparent display may have both a first viewing side 201 and a second viewing side 202, wherein the first viewing side 201 is opposite the second viewing side 202. Transmissive displays, transflective displays, and reflective displays have just one viewing side. In other words, transmissive displays, transflective displays, and reflective displays have either first viewing side 201 or second viewing side 202.

Referring to FIG. 5A and all subsequent implementations, all novel LCDs described may be configured with a conventional arrangement of pixel electrodes, LC alignment layers, and polarizers in order to create a variety of different LC modes including but not limited to a twisted nematic (TN) LC mode, a vertically aligned (VA) LC mode, an in-plane switching (IPS) LC mode or an FFS LC mode, and a scattering LC mode (e.g., switchable between transparent state and a scattering state). Said LC modes may be single domain or multi-domain. Said LC modes may be conventional.

All subsequent implementations show novel LCDs wherein each pixel (or sub-pixel) of the novel LCD has pixel electrodes that are deposited on either the first or second substrate only. Such LC modes are either an in-plane switching (IPS) LC mode or an FFS LC mode. It will be appreciated to those familiar with LCDs that all subsequent disclosures may be modified so that each pixel (or sub-pixel) of the novel LCD has pixel electrodes that are deposited on both the first and second substrate to enable an out-of-plane LC switching mode, such as a twisted nematic (TN) LC mode, a vertically aligned (VA) LC mode, etc.

Figure 6:
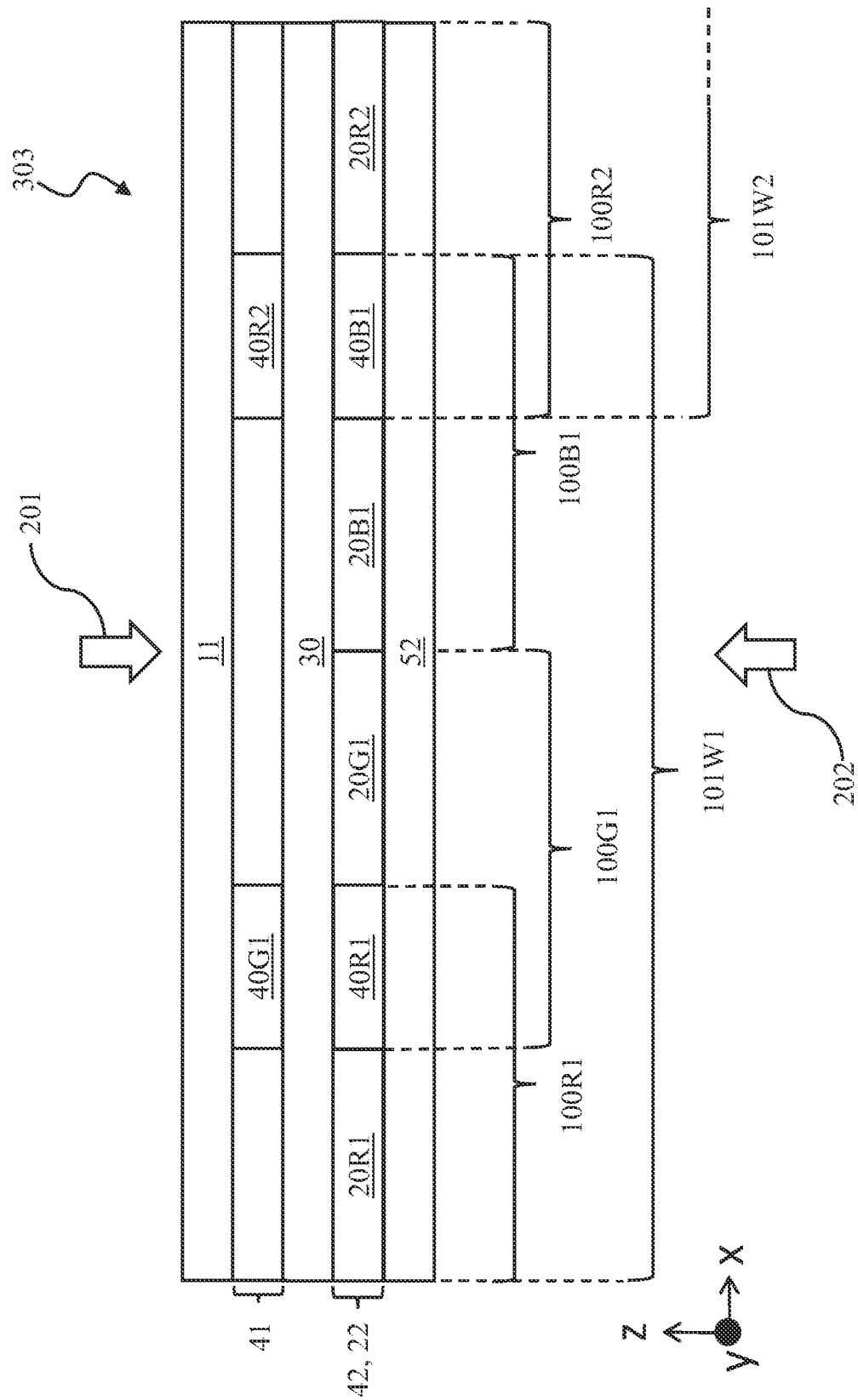
FIG. 6 illustrates a cross section view of components of a first alternative implementation LCD apparatus with TFTs deposited on two substrates, in accordance with an example implementation of the present disclosure.

FIG. 6 shows a novel LCD 303 that is a variation of the novel LCD 302 of FIG. 5A. The significant difference between novel LCD 302 and novel LCD 303 is that the latter has color filters while the former does not. Aside from color filters, all other features shown and described are common to both novel LCD 302 and 303. Novel LCD 303 includes a first substrate 11, a first TFT array 41 deposited on the first substrate 11, an LC layer 30, a second TFT array 42 and first color filter array 22 deposited on a second substrate 52. Many conventional elements of the novel LCD 303, such as drive electrodes (row and column electrodes), pixel electrodes, LC alignment layers, polarizers, etc.) have been omitted for clarity.

The pixel electrodes (not shown) may be deposited above and/or below color filter layer 22. TFT 40R1 controls light modulation in sub-pixel 100R1 (red sub-pixel 1), TFT 40G1 controls light modulation in sub-pixel 100G1 (green sub-pixel 1), TFT 40B1 controls light modulation in sub-pixel 100B1 (blue sub-pixel 1), and TFT 40R2 controls light modulation in sub-pixel 100R2 (red sub-pixel 2). White pixel 101W1 is comprised of red sub-pixel 100R1, green sub-pixel 100G1, and blue sub-pixel 100B1. In general, each of the sub-pixels pertaining to the novel LCD 303 has at least one storage capacitor (not shown). The area occupied by a TFT (e.g., 40R1, 40G1, 40B1, and 40R2) may also contain a storage capacitor (not shown) for the respective sub-pixel. Although FIG. 6 only shows four color sub-pixels, it will be appreciated that a plurality of many hundreds or even thousands of sub-pixels and/or pixels may extend in both lateral (x) and longitudinal (y) directions across the novel LCD 303.

Referring to FIGS. 5B and 6, TFTs 40G1 and 40R2 (FIG. 6) are connected to row electrode 601a (FIG. 5B). TFT 40G1 (FIG. 6) is connected to column electrode 501a (FIG. 5B) and TFT 40R2 (FIG. 6) is connected to column electrode 502a (FIG. 5B). In conventional LCDs, all TFTs 40 are connected to at least one row electrode and at least one column electrode. A first array of row electrodes (e.g., 601a, etc.) and column electrodes (e.g., 501a, 502a, etc.) are deposited on the first substrate 11. The first array of row electrodes (601a) and column electrodes (501a, 502a) may be known collectively as the first array of driving electrodes (700a). Although FIG. 5B only shows one row electrode (601a) and two column electrodes (501a, 502a), it will be appreciated that many hundreds or even thousands of row and column electrodes may extend in both the lateral (x) and longitudinal (y) directions in the novel LCDs described herein.

Referring to FIGS. 5C and 6, TFT 40R1 and TFT 40B1 are connected to row electrode 601b. TFT 40R1 (FIG. 6) is connected to column electrode 501b (FIG. 5C) and TFT 40B1 (FIG. 6) is connected to column electrode 502b (FIG. 5C). In conventional LCDs, all TFTs 40 are connected to at least one row electrode and at least one column electrode. A second array of row electrodes (601b, etc.) and column electrodes (501b, 502b, etc.) are deposited on the second substrate 52. The second array of row electrodes (e.g., 601b) and column electrodes (e.g., 501b, 502b) may be known collectively as the second array of driving electrodes 700b. Although FIG. 5C only shows one row electrode 601b and two column electrodes 501b, 502b, it will be appreciated that a plurality of many hundreds or even thousands of row and column electrodes may extend in both the lateral (x) and longitudinal (y) directions across the novel LCDs described herein.

Regarding FIG. 5D and FIG. 6, the first TFT array 41 (disposed on the first substrate 11) and second TFT array 42 (disposed on the second substrate 52) are aligned in both a lateral direction (x-direction) and longitudinal direction (y-direction) so that the TFTs of the first TFT array 41 overlap the TFTs of the second TFT array 42. In other words, the spatial positioning (x, y) of the first TFT array 41 and second TFT array 42 are the same or substantially the same. The first TFT array 41 and the second TFT array 42 are physically separated in the viewing direction (e.g., physically separated in the z-direction). Consequently, and with reference to FIG. 5D and FIG. 6, only the TFTs pertaining to the first TFT array 41 (e.g., 40G1 and 40R2) are visible from viewing side 201. In other words, TFT 40G1 obscures TFT 40R1 because TFT 40G1 is directly above (e.g., completely overlaps) TFT 40R1 from viewing side 201. Likewise, TFT 40R2 obscures TFT 40B1 in viewing side 201. The first TFT array 41 and the second TFT array 42 are physically separated in the viewing direction (e.g., physically separated in the z-direction).

Referring to FIGS. 5B, 5C, 5D, and 6, the first array of drive electrodes 700a are aligned in a lateral position (x-direction) and a longitudinal position (y-direction) so that the first array of drive electrodes 700a overlap the second array of drive electrodes 700b. In other words, the spatial positioning (x, y) of the first array of drive electrodes 700a and second array of drive electrodes 700b are the same or substantially the same. Consequently, and with reference to FIGS. 5B and 5D, only the first array of drive electrodes 700a are visible from the first viewing side 201. In other words, the first array of drive electrodes 700a obscures the second array of drive electrodes 700b because the first array of drive electrodes 700a are directly above (e.g., completely overlap) the second array of drive electrodes 700b in the viewing side 201. Likewise, and with reference to FIGS. 5C and 5D, only the second array of drive electrodes 700b are visible from the second viewing direction 202. The first array of drive electrodes 700a and the second array of drive electrodes 700b are physically separated in the viewing direction (e.g., in the z-direction).

Referring to FIG. 6, the novel LCD 303 is shown to have TFT 40G1 for controlling light modulation of green sub-pixel 100G1 and TFT 40R2 for controlling light modulation of red sub-pixel 100R2 deposited on the first substrate 11. The novel LCD 303 is also shown to have TFT 40R1 for controlling light modulation of red sub-pixel 100R1 and TFT 40B1 for controlling light modulation of blue sub-pixel 100B1 deposited on second substrate 52. In general, the first substrate 11 may contain any combination of TFTs for controlling light modulation of red, green, and/or blue color sub-pixels. In general, the second substrate 52 may contain any combination of TFTs for controlling light modulation of red, green, and/or blue color sub-pixels.

The novel LCD 303 shown in FIG. 6 may be part of a transmissive display, reflective display, transflective display, or transparent display. The first substrate 11 may be located on the first viewing side 201 of the novel LCD 303 and/or the second substrate 52 may be located on the first viewing side 201 of novel LCD 303. A transparent display may have both first viewing side 201 and second viewing side 202. Transmissive displays, transflective displays, and reflective displays have just one viewing side. In other words, transmissive displays, transflective displays, and reflective displays have either first viewing side 201 or second viewing side 202.

Referring to FIG. 6, a patterned array of black mask material (not shown) may be deposited on the first substrate 11 and/or the second substrate 52. The black mask usually surrounds each color filter and is often located above and/or below the TFT electronics. The black mask is often located above and/or below the addressing electrodes (e.g., above and/or below the source electrodes and the gate electrodes, etc.)

Figure 7:
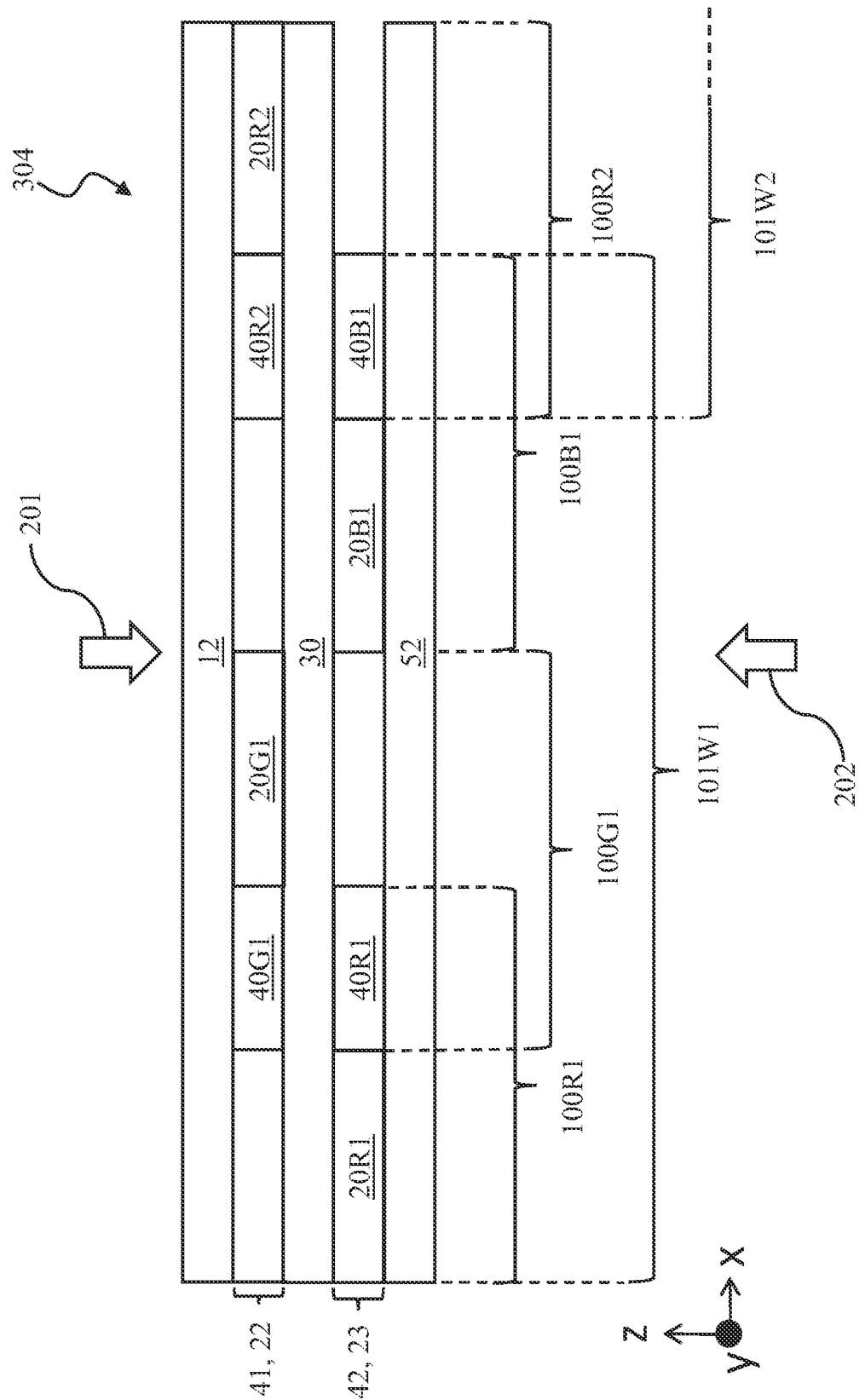
FIG. 7 illustrates a cross section view of components of a second alternative implementation LCD apparatus with TFTs deposited on two substrates, in accordance with an example implementation of the present disclosure.

FIG. 7 shows a novel LCD 304 that is a variation of the novel LCD 303 shown in FIG. 6. The significant difference between novel LCD 303 and novel LCD 304 is that the latter has color filters deposited on both the first substrate 12 and the second substrate 52. Aside from the alternative arrangement of color filters, all other features shown and described are common to both novel LCDs 303, 304. The novel LCD 304 includes a first substrate 12, a first TFT array 41 deposited on the first substrate 12 along with a first color filter array 22 deposited on the first substrate 12, an LC layer 30, a second TFT array 42 deposited on the second substrate 52 along with a second color filter array 23 deposited on the second substrate 52. Many conventional elements of the novel LCD 304, such as drive electrodes (row and column electrodes), pixel electrodes, LC alignment layers, polarizers, etc., have been omitted for clarity. The pixel electrodes (not shown) may be deposited above and/or below the color filter layers 22, 23.

TFT 40R1 controls light modulation in sub-pixel 100R1 (red sub-pixel 1), TFT 40G1 controls light modulation in sub-pixel 100G1 (green sub-pixel 1), TFT 40B1 controls light modulation in sub-pixel 100B1 (blue sub-pixel 1), and TFT 40R2 controls light modulation in sub-pixel 100R2 (red sub-pixel 2). White pixel 101W1 is comprised of red sub-pixel 100R1, green sub-pixel 100G1, and blue sub-pixel 100B1. Although FIG. 7 only shows four color sub-pixels, it will be appreciated that a plurality of many hundreds or even thousands of sub-pixels and/or pixels extend in both the lateral and longitudinal directions in the novel LCD 304.

The novel LCD 304 is shown to have green color filter 20G1 and red color filter 20R2 deposited on the first substrate 12, while red color filter 20R1 and blue color filter 20B1 are deposited on the second substrate 52. In general, the first substrate 12 may contain any combination of red, green, and/or blue color filters. In general, the second substrate 52 may contain any combination of red, green, and/or blue color filters.

The novel LCD 304 is shown to have TFT 40G1 for controlling light modulation of green sub-pixel 100G1 and TFT 40R2 for controlling light modulation of red sub-pixel 100R2 deposited on the first substrate 12. The novel LCD 304 is shown to have TFT 40R1 for controlling light modulation of red sub-pixel 100R1 and TFT 40B1 for controlling light modulation of blue sub-pixel 100B1 deposited on the second substrate 52. In general, the first substrate 12 may contain any combination of TFTs for controlling light modulation of red, green, and/or blue color sub-pixels. In general, the second substrate 52 may contain any combination of TFTs for controlling light modulation of the red, green, and/or blue color sub-pixels.

The novel LCD 304 may be part of a transmissive display, reflective display, transflective display, or transparent display. The first substrate 12 may be located on the first viewing side 201 of the novel LCD 304 and/or the second substrate 52 may be located on the first viewing side 201 of the novel LCD 304. A transparent display may have both a first viewing side 201 and a second viewing side 202. Transmissive displays, transflective displays, and reflective displays have just one viewing side. In other words, transmissive displays, transflective displays, and reflective displays have either first viewing side 201 or second viewing side 202.

A patterned array of black mask material (not shown) may be deposited on the first substrate 12 and/or the second substrate 52. The black mask usually surrounds each color filter and is often located above and/or below the TFT electronics. The black mask is often located above and/or below the addressing electrodes (e.g., above and/or below the source electrodes and the gate electrodes, etc.).

Figure 8A:
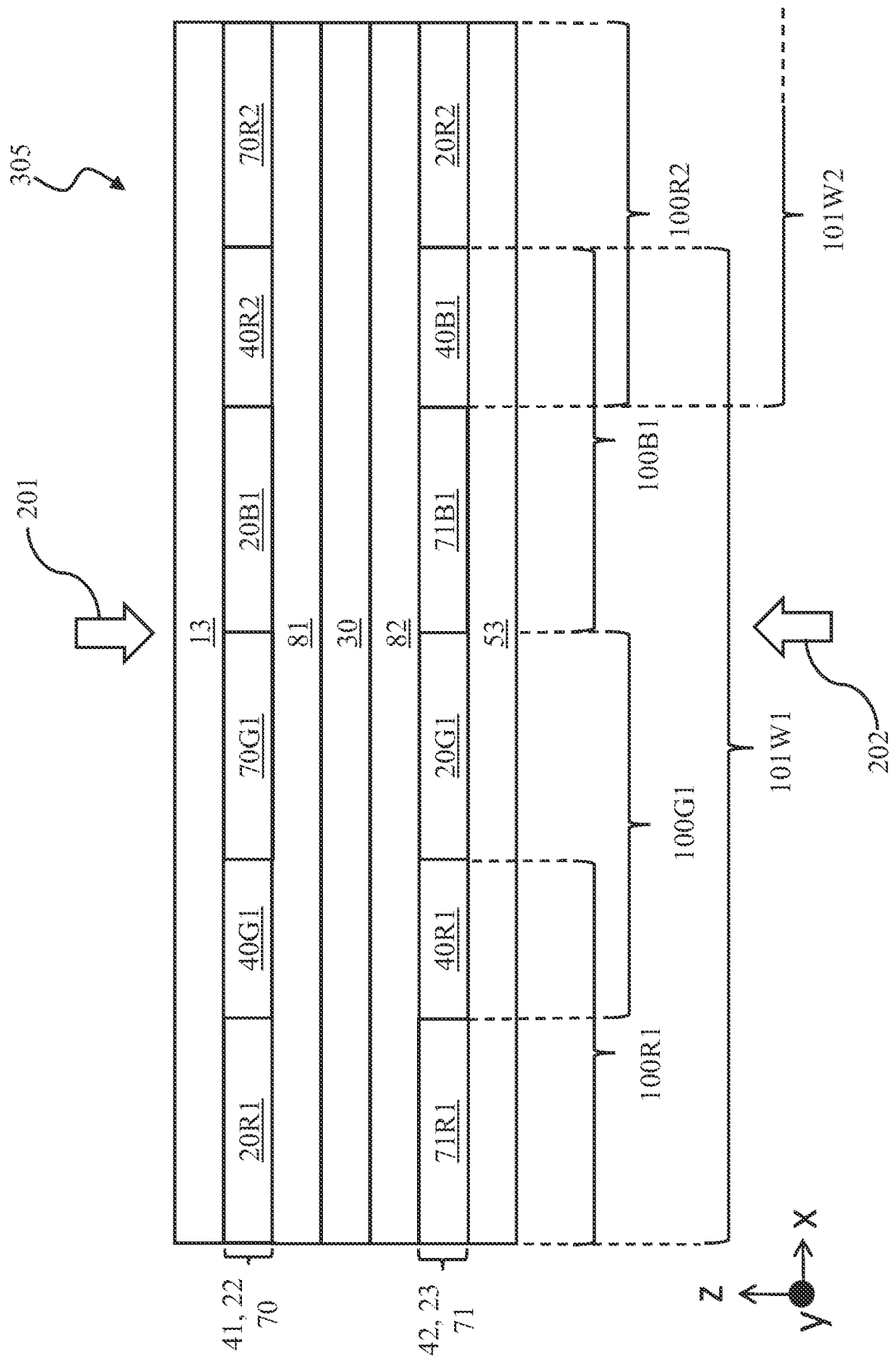
FIG. 8A illustrates a cross section view of components of a third alternative implementation LCD apparatus with TFTs deposited on two substrates, in accordance with an example implementation of the present disclosure.

FIG. 8A shows a novel LCD 305 that is a variation of the novel LCD 304 shown in FIG. 7. The significant difference between the novel LCD 304 and the novel LCD 305 is that the latter has associated color filters and TFTs deposited on opposing substrates. TFT 40R1 for red sub-pixel 100R1 is deposited on the second substrate 53 while the associated red color filter 20R1 for red sub-pixel 100R1 is deposited on the opposing first substrate 13. TFT 40G1 for green sub-pixel 100G1 is deposited on the first substrate 13 while the associated color filter 20G1 for green sub-pixel 100G1 is deposited on the opposing second substrate 53. Aside from the alternative arrangement of associated color filters and TFTs, all other features shown and described are common to both novel LCDs 304 and 305.

Novel LCD 305 includes a first substrate 13, a first TFT array 41 deposited on the first substrate 13, a first color filter array 22 deposited on the first substrate 13, a first array of pixel electrodes 70 deposited on the first substrate 13, a first LC alignment layer 81, an LC layer 30, a second LC alignment layer 82, a second TFT array 42 deposited on the second substrate 53, a second color filter array 23 deposited on the second substrate 53 and a second array of pixel electrodes 71 deposited on the second substrate 53. Many conventional elements of the novel LCD 305, such as drive electrodes (row and column electrodes), polarizers, etc., have been omitted for clarity.

TFT 40R1 controls light modulation in sub-pixel 100R1 (red sub-pixel 1), TFT 40G1 controls light modulation in sub-pixel 100G1 (green sub-pixel 1), TFT 40B1 controls light modulation in sub-pixel 100B1 (blue sub-pixel 1), and TFT 40R2 controls light modulation in sub-pixel 100R2 (red sub-pixel 2). White pixel 101W1 is comprised of a red sub-pixel 100R1, a green sub-pixel 100G1, and a blue sub-pixel 100B1. Although FIG. 8A only shows four color sub-pixels, it will be appreciated that a plurality of many hundreds or even thousands of sub-pixels and/or pixels extend in both the lateral and longitudinal directions across the novel LCD 305.

Novel LCD 305 is shown to have red color filter 20R1 and blue color filter 20B1 deposited on the first substrate 13 while green color filter 20G1 and red color filter 20R2 are deposited on the second substrate 53. In general, the first substrate 13 may contain any combination of red, green, and/or blue color sub-pixels. In general, the second substrate 53 may contain any combination of red, green, and/or blue color sub-pixels.

Novel LCD 305 is shown to have TFT 40G1 for controlling light modulation of green sub-pixel 100G1 and TFT 40R2 for controlling light modulation of red sub-pixel 100R2 deposited on the first substrate 13. Novel LCD 305 is shown to have both TFT 40R1 for controlling light modulation of red sub-pixel 100R1 and TFT 40B1 for controlling light modulation of blue sub-pixel 100B1 deposited on the second substrate 53. In general, the first substrate 13 may contain any combination of TFTs for controlling light modulation of red, green, and/or blue color sub-pixels. In general, the second substrate 53 may contain any combination of TFTs for controlling light modulation of red, green, and/or blue color sub-pixels.

Novel LCD 305 may be part of a transmissive display, reflective display, transflective display, or transparent display. The first substrate 13 may be located on the first viewing side 201 of the novel LCD 305 and/or the second substrate 53 may be located on the first viewing side 201 of the novel LCD 305. A transparent display may have both a first viewing side 201 and a second viewing side 202. Transmissive displays, transflective displays, and reflective displays have just one viewing side. In other words, transmissive displays, transflective displays, and reflective displays have either first viewing side 201 or second viewing side 202.

A patterned array of black mask material (not shown) may be deposited on the first substrate 13 and/or the second substrate 53. The black mask usually surrounds each color filter and is often located above and/or below the TFT electronics. The black mask is often located above and/or below the addressing electrodes (e.g., above and/or below the row electrodes and the column electrodes, etc.).

FIGS. 8A, 8B, and 8C show that the first array of pixel electrodes 70 pertaining to a first substrate 13 and the second array of pixel electrodes 71 pertaining to a second substrate 53 may be a conventional design of In-Plane Switching (IPS) electrodes. With reference to FIGS. 8B and 8C, a conventional design of In-Plane Switching (IPS) electrodes (72, 73) is shown that may be used in conjunction with the novel LCD 305 shown in FIG. 8A. Pixel electrodes 72 or 73 may be electrically connected (not shown) to the TFT 40. Pixel electrodes 72 or 73 may be electrically connected (not shown) to a common source. With reference to FIG. 8C, the TFT 40 may be any TFT in the TFT array (e.g., 40R1, 40G1, 40B1 etc.). The IPS electrode design may also be applied to pixels and/or sub-pixels pertaining to the LCD designs shown in FIGS. 5A, 6, and 7. The IPS pixel electrodes 72, 73 may be the pixel electrodes 71R1, 70G1, 71B1, etc., pertaining to novel LCD 305. Although the IPS pixel electrodes 72, 73 are shown deposited on the second substrate 53, a similar arrangement (not shown) of IPS pixel electrodes 72, 73 are also deposited on the first substrate 13. The IPS electrodes 72, 73 comprise at least one first pixel electrode 72 and at least one second pixel electrode 73 that are interdigitated.

The IPS electrodes 72, 73 may be a conventional stripe design or a conventional chevron design and may be arranged substantially parallel to each other. A first voltage is applied to the first pixel electrode 72 and a second voltage is applied to the second pixel electrode 73 to switch the LC layer 30 in a conventional fashion. The voltages applied to the pixel electrodes 72, 73 are controlled by the associated TFT 40 and other drive electronics in a conventional fashion. One of the pixel electrodes (72 or 73) may be connected to the associated TFT 40 while the other pixel electrode is connected to a common electrode (not shown). The alignment layers 81, 82 may align the LC molecules substantially parallel to the IPS pixel electrodes 72, 73 for use with a positive delta epsilon (+Δε) LC material. The alignment layers 81, 82 may align the LC molecules substantially perpendicular to the IPS pixel electrodes 72, 73 for use with a negative delta epsilon (−Δε) LC material.

Figures 8D, 8E:
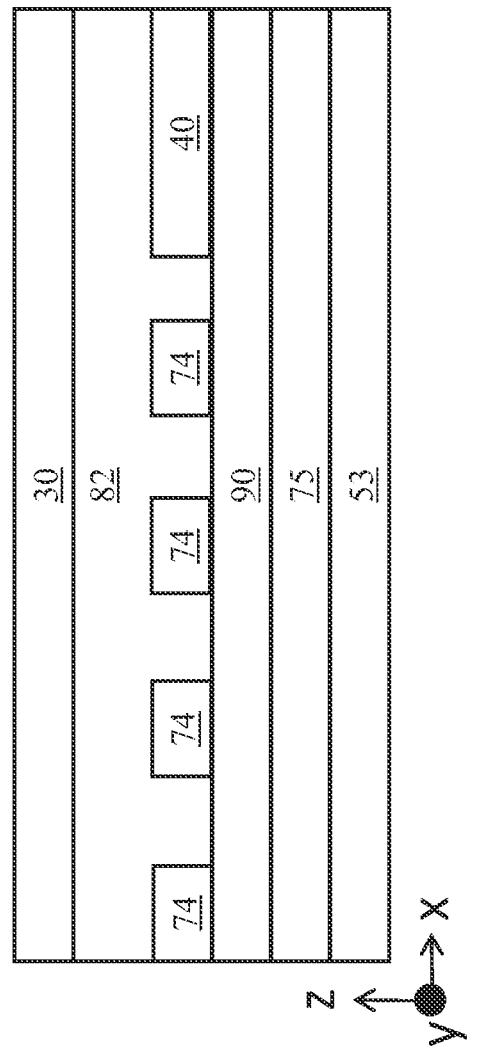
FIG. 8D illustrates a plan view of fringe field switching pixel electrodes, in accordance with an example implementation of the present disclosure.
FIG. 8E illustrates a cross section view of fringe field switching pixel electrodes, in accordance with an example implementation of the present disclosure.

FIGS. 8A, 8D, and 8E show that the first array of pixel electrodes 70 pertaining to a first substrate 13 and the second array of pixel electrodes 71 pertaining to a second substrate 53 may be a conventional design of FFS electrodes. Referring to FIGS. 8D and 8E, a conventional design of FFS electrodes 74, 75 are shown that may be used in conjunction with the novel LCD 305 shown in FIG. 8A. Pixel electrodes 72 or 73 may be electrically connected (not shown) to the TFT 40. Pixel electrodes 72 or 73 may be electrically connected (not shown) to a common source. With reference to FIG. 8C, the TFT 40 may be any TFT in the TFT array (e.g., 40R1, 40G1, 40B1, etc.). The FFS electrode design may also be applied to pixels and/or sub-pixels pertaining to the LCD designs shown in FIGS. 5A, 6, and 7. The FFS pixel electrodes 74, 75 may be the pixel electrodes 71R1, 70G1, 71B1, etc. pertaining to novel LCD 305.

Although the FFS pixel electrodes 74, 75 are shown deposited on the second substrate 53, a similar arrangement (not shown) of FFS pixel electrodes 74, 75 are also deposited on the first substrate 13. The FFS electrodes 74, 75 comprise at least one first pixel electrode 74 and at least one second pixel electrode 75 wherein first pixel electrode 74 and second pixel electrode 75 are separated by an insulation layer 90. The first FFS pixel electrodes 74 may be a conventional stripe design or a conventional chevron design and adjacent similar electrodes are arranged substantially parallel to each other.

A first voltage is applied to the first pixel electrode 74 and a second voltage is applied to the second pixel electrode 75 to switch the LC layer 30 in a conventional fashion. The voltages applied to the pixel electrodes 74, 75 are controlled by the associated TFT 40 and other drive electronics in a conventional fashion. One of the first pixel electrodes 74 may be connected to the associated TFT 40 while the second pixel electrode 75 may be connected to a common electrode (not shown). The alignment layers 81, 82 may align the LC molecules substantially parallel to the FFS pixel electrodes 74, 75 for use with a positive delta epsilon (+Δε) LC material. The alignment layers 81, 82 may align the LC molecules substantially perpendicular to the FFS pixel electrodes 74. 75 for use with a negative delta epsilon (−Δε) LC material.

The advantage of novel LCD 305 over the previously disclosed novel LCDs (303, 304 shown in FIGS. 6 and 7) is that the novel LCD 305 may have lower power consumption. The lower power consumption may be realized because a lower driving voltage may be required to switch LC layer 30. In other words, a lower voltage may be required to obtain the maximum luminance in the novel LCD 305 compared with the voltage required to obtain the maximum luminance in novel LCDs 303 and 304.

The lower voltage required for maximum luminance may be realized in the novel LCD 305 because each pixel electrode (e.g., 70, 71, 70G1, 70R2, 71R1, 71B1 etc.) is located on the opposing substrate to the color filter of the associated sub-pixel. Consequently, the electric field from a pixel electrode does not have to penetrate through the associated color filter layer to switch the LC layer 30. In other words, there may be no voltage drop across the color filter layers 22, 23 in the novel LCD 305 compared with the previously described novel LCDs 303 and 304. Avoiding a voltage drop across the color filter layers 22, 23 has the advantage of reducing power consumption in the novel LCD 305. In addition, the LC layer 30 is located physically closer (in the z-direction) to the pixel electrodes (e.g., 70, 71, 70G1, 70R2, 71R1, 71B1, etc.) in the novel LCD 305 compared with the previously described novel LCDs 303 and 304, which may also reduce the maximum required voltage in the novel LCD 305.

Figure 9:
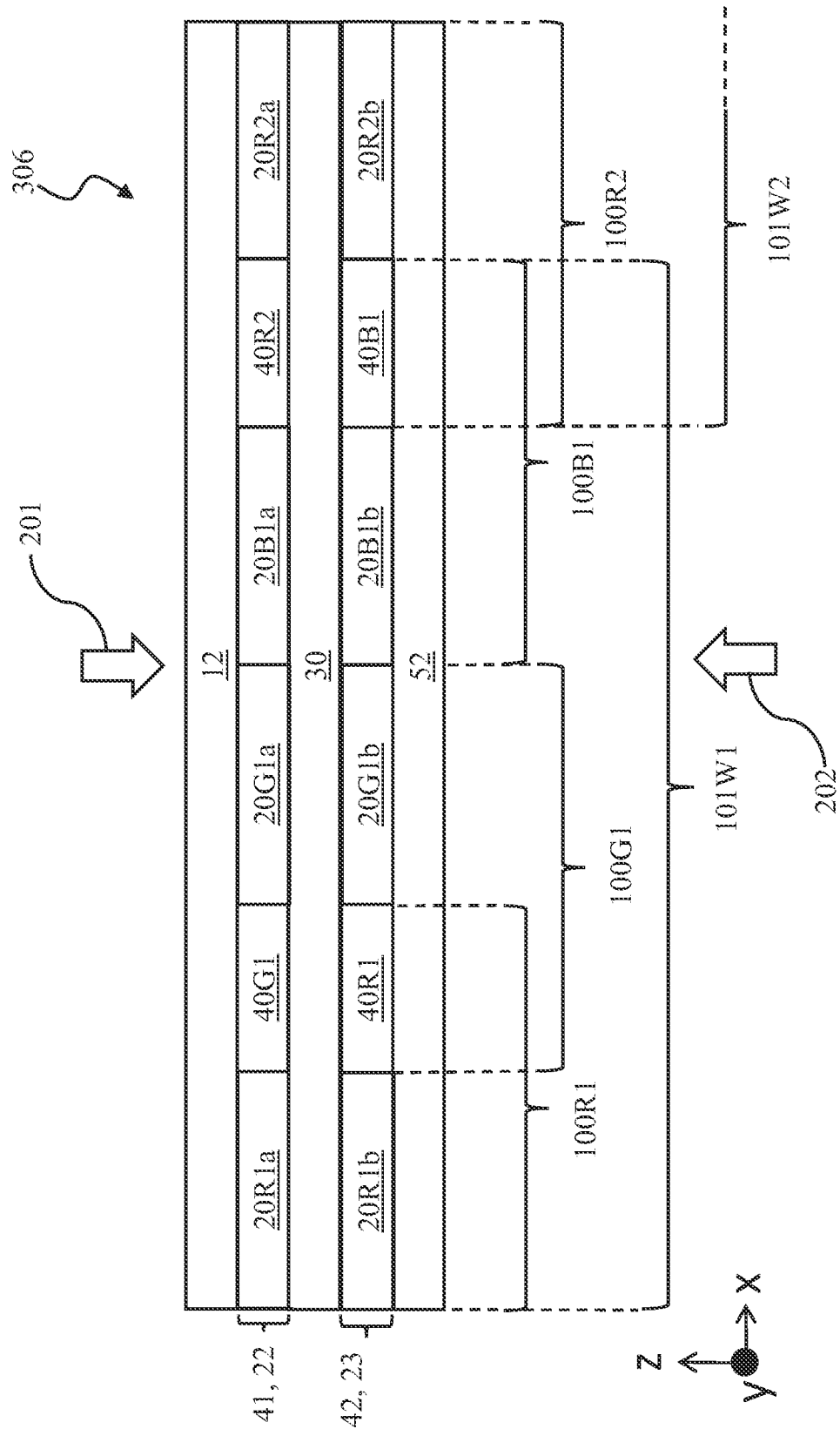
FIG. 9 illustrates a cross section view of components of a fourth alternative implementation LCD with TFTs and color filters deposited on two substrates, in accordance with an example implementation of the present disclosure.

FIG. 9 shows a novel LCD 306 that is a variation of the previously disclosed novel LCDs (303, 304, and 305 shown in FIGS. 6, 7, and 8A). The significant difference between the previously disclosed novel LCDs 303, 304, 305 and novel LCD 306 is that the latter has the same type of color filters deposited on both the first substrate 12 and the second substrate 52 so that the same type of color filters are in the same lateral (x) position and longitudinal (y) position. In other words, the same types of color filters overlap when seen from the first viewing side 201. Aside from an alternative arrangement of color filters, many other features of the novel LCD 306 are common to the previously described novel LCDs (303, 304 and 305).

Novel LCD 306 includes a first substrate 12, a first TFT array 41 deposited on the first substrate 12, a first color filter array 22 deposited on the first substrate 12, an LC layer 30, a second TFT array 42 deposited on the second substrate 52 and a second color filter array 23 deposited on the second substrate 52. Many conventional elements of the novel LCD 306, such as drive electrodes (row and column electrodes), pixel electrodes, LC alignment layers, polarizers, etc., have been omitted for clarity. The pixel electrodes (not shown) may be deposited above and/or below the color filter layers 22, 23. The IPS electrode design shown in FIGS. 8B and 8C may also be applied to pixels and/or sub-pixels pertaining to the LCD design shown in FIG. 9. The FFS electrode design shown in FIGS. 8D and 8E may also be applied to pixels and/or sub-pixels pertaining to the LCD design shown in FIG. 9. TFT 40R1 controls light modulation in sub-pixel 100R1 (red sub-pixel 1), TFT 40G1 controls light modulation in sub-pixel 100G1 (green sub-pixel 1), TFT 40B1 controls light modulation in sub-pixel 100B1 (blue sub-pixel 1), and TFT 40R2 controls light modulation in sub-pixel 100R2 (red sub-pixel 2).

The white pixel 101W1 is comprised of red sub-pixel (100R1), green sub-pixel (100G1) and blue sub-pixel (100B1). Although FIG. 9 only shows four color sub-pixels, it will be appreciated that a plurality of many hundreds or even thousands of sub-pixels and/or pixels extend in both the lateral and longitudinal directions in novel LCD 306.

Novel LCD 306 is shown to have red color filters 20R1*a*, 20R2*a*, a green color filter 20G1*a*, and a blue color filter 20B1*a* deposited on the first substrate 12, while red color filters 20R1*b*, 20R2*b*, a green color filter 20G1*b*, and a blue color filter (20B1*b*) are deposited on the second substrate 52. In general, the first substrate 12 may contain any combination of red, green, and/or blue color filters. In general, the second substrate 52 may contain any combination of red, green, and/or blue color filters.

Novel LCD 306 may be part of a transmissive display, reflective display, transflective display, or transparent display. The first substrate 12 may be located on the first viewing side 201 of the novel LCD 306 and/or the second substrate 52 may be located on the first viewing side 201 of the novel LCD 306. A transparent display may have both a first viewing side 201 and a second viewing side 202. Transmissive displays, transflective displays, and reflective displays have just one viewing side. In other words, transmissive displays, transflective displays, and reflective displays have either first viewing side 201 or second viewing side 202.

A patterned array of black mask material (not shown) may be deposited on the first substrate 12 and/or the second substrate 52. The black mask usually surrounds each color filter and is often located above and/or below the TFT electronics. The black mask is often located above and/or below the addressing electrodes (e.g., above and/or below the row electrodes and the column electrodes, etc.).

Conventional LCDs are comprised of a first substrate and a second substrate wherein the features deposited onto the first substrate are different to the features deposited on the second substrate. For example, many conventional LCDs are comprised of a first substrate disposed on the viewing side that has an array of color filters deposited on the first substrate (e.g., the first substrate is said to be a color filter substrate) and a second substrate disposed on the non-viewing side that has a TFT array and an array of drive electrodes disposed on the second substrate (e.g., the second substrate is said to be a TFT substrate).

An LCD that has different features disposed on the first and second substrates requires separate manufacturing production lines for the first and second substrates. An economic advantage may be realized if the same manufacturing production line may be used to at least partially fabricate both the first and second substrate. Implementations described herein may be used to create a novel LCD comprised of a first substrate and a second substrate, wherein the TFT array and the array of drive electrodes pertaining to the first and second substrates are identical.

Consequently, the same manufacturing production line may be used to fabricate at least partially both the first and second substrate that pertain to the novel LCD (e.g., 301, 302, 303, 304, 305, and 306). Further economic advantage may be realized if the same manufacturing production line may be used to completely fabricate both the first and second substrate (e.g., the first and second substrate are identical). Other implementations described within may be used to create a novel LCD comprised of a first substrate and a second substrate wherein all features pertaining to the first and second are identical (e.g., the first and second substrate are identical).

Any of the previously disclosed novel LCDs (302, 303, 304, 305, and 306) may be comprised of a first substrate and second substrate wherein the first substrate has at least some identical features to the second substrate. Any of the previously disclosed novel LCDs (302, 303, 304, 305, and 306) may be comprised of a first substrate and second substrate wherein the first substrate has identical features to the second substrate. In other words, all features (drive electrodes, TFTs etc.) deposited onto the first substrate are identical to all features (drive electrodes, TFTs etc.) deposited onto the second substrate.

Figure 11A:
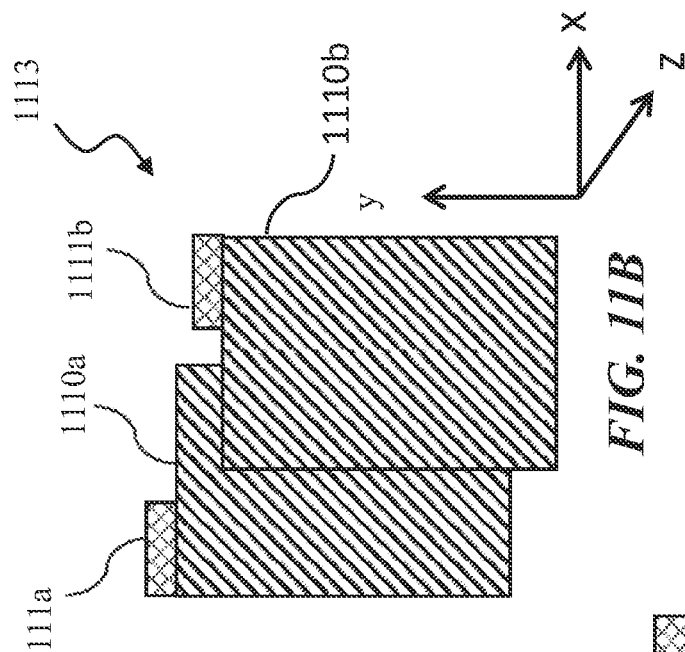
FIG. 11A illustrates a plan view of an identical first substrate and a second substrate, each having first implementation protruding edges, in accordance with an example implementation of the present disclosure.
Figure 11A:
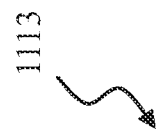
Figure 11A:
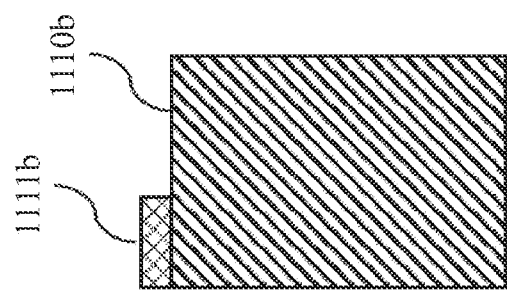
Figure 11B:
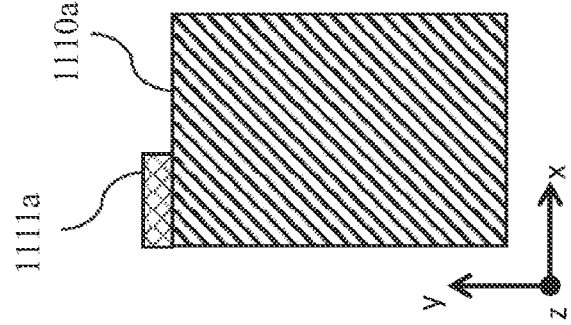
FIG. 11B illustrates a plan view of the first substrate and the second substrate partially overlapping with first implementation protruding edges, in accordance with an example implementation of the present disclosure.
Figure 11C:
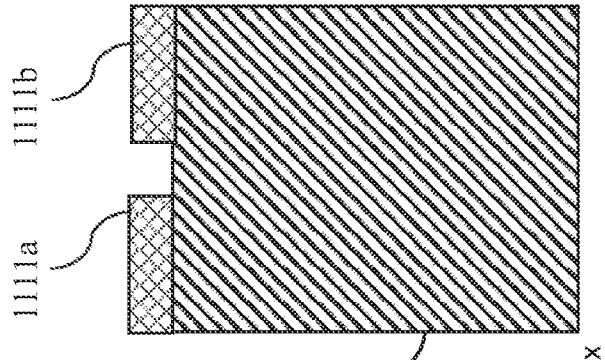
FIG. 11C illustrates a plan view of the first substrate and the second substrate, completely overlapping with first implementation protruding edges, in accordance with an example implementation of the present disclosure.
Figure 12B:
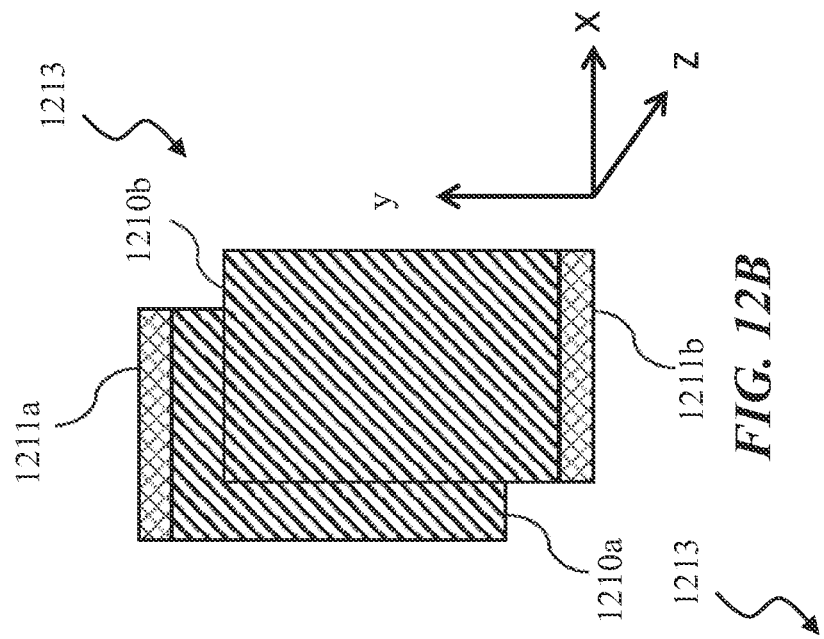
FIG. 12B illustrates a plan view of the first substrate and the second substrate partially overlapping with second implementation protruding edges, in accordance with an example implementation of the present disclosure.
Figure 12C:
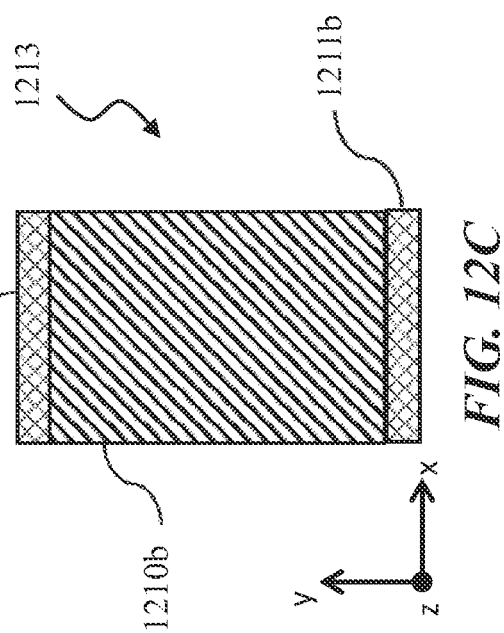
FIG. 12C illustrates a plan view of the first substrate and the second substrate completely overlapping with second implementation protruding edges, in accordance with an example implementation of the present disclosure.
Figure 12A:
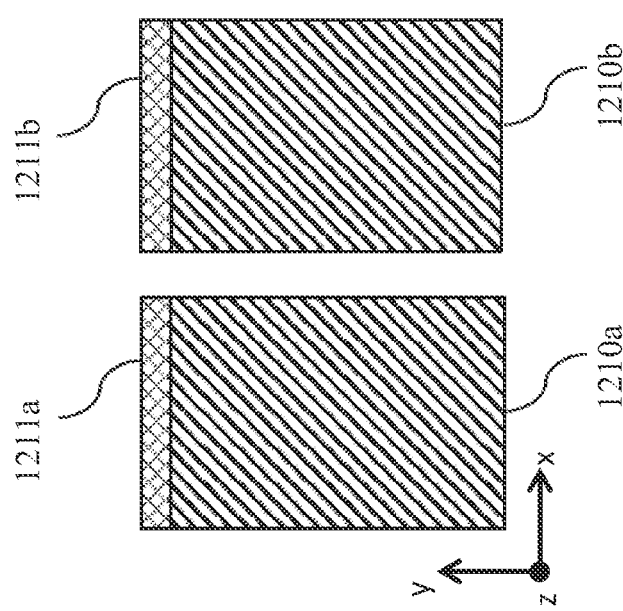
FIG. 12A illustrates a plan view of an identical first substrate and a second substrate, each having second implementation protruding edges, in accordance with an example implementation of the present disclosure.
Figure 13A:
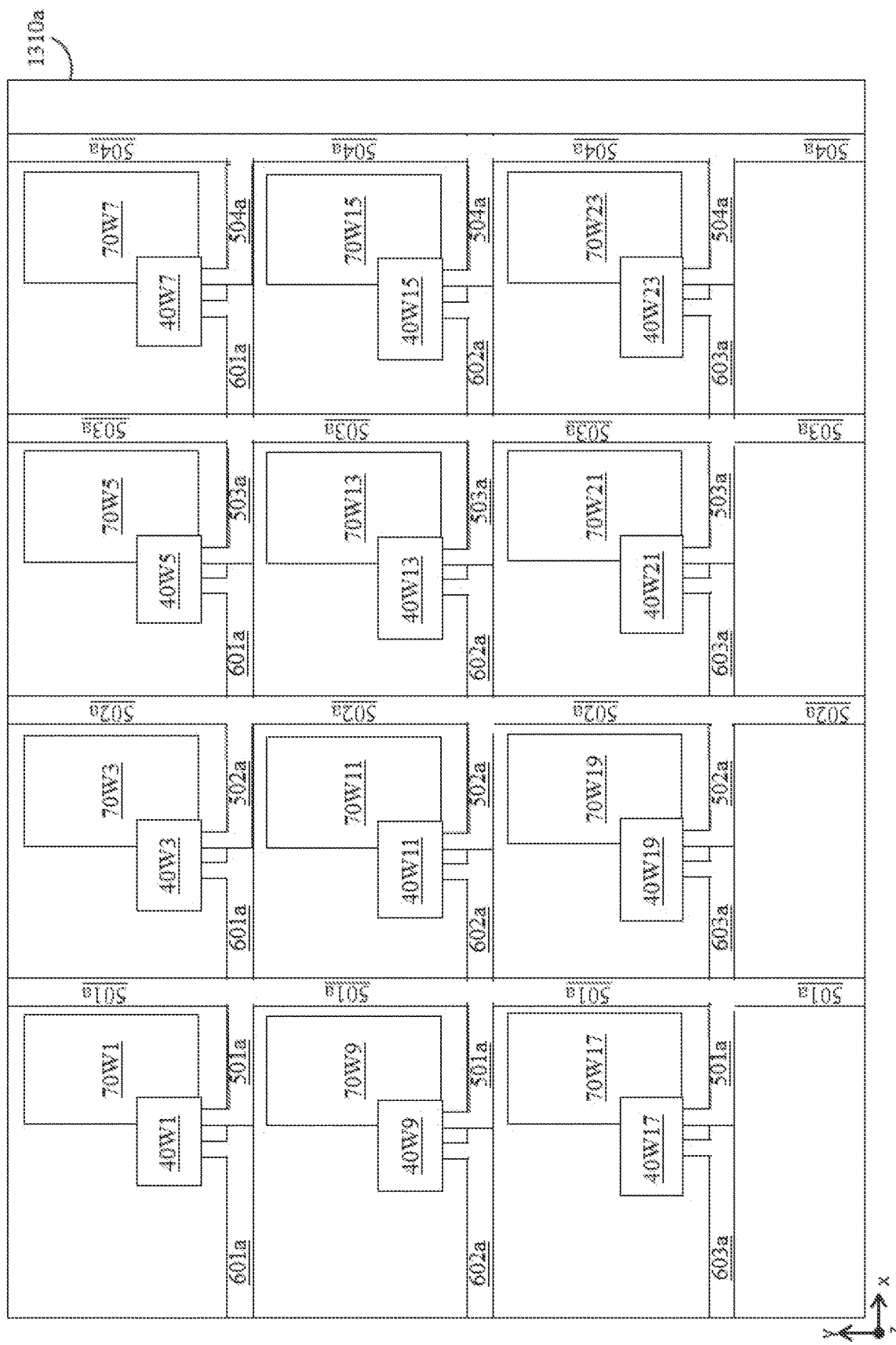
FIG. 13A illustrates a plan view of a first substrate having a TFT array, an array of drive electrodes, and an array of pixel electrodes, in accordance with an example implementation of the present disclosure.
Figure 13B:
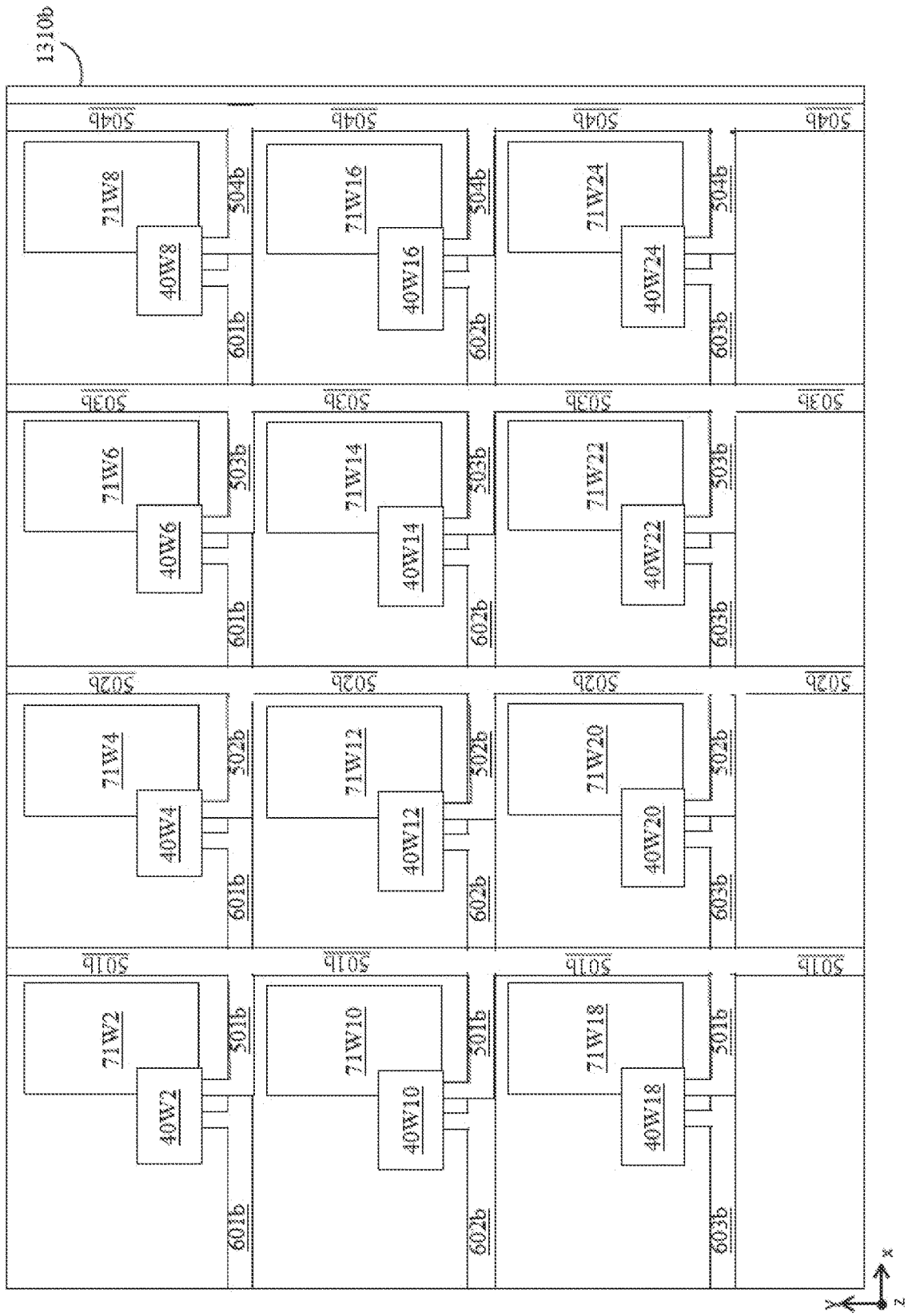
FIG. 13B illustrates a plan view of a second substrate having a TFT array, an array of drive electrodes, and an array of pixel electrodes, in accordance with an example implementation of the present disclosure.
Figure 14A:
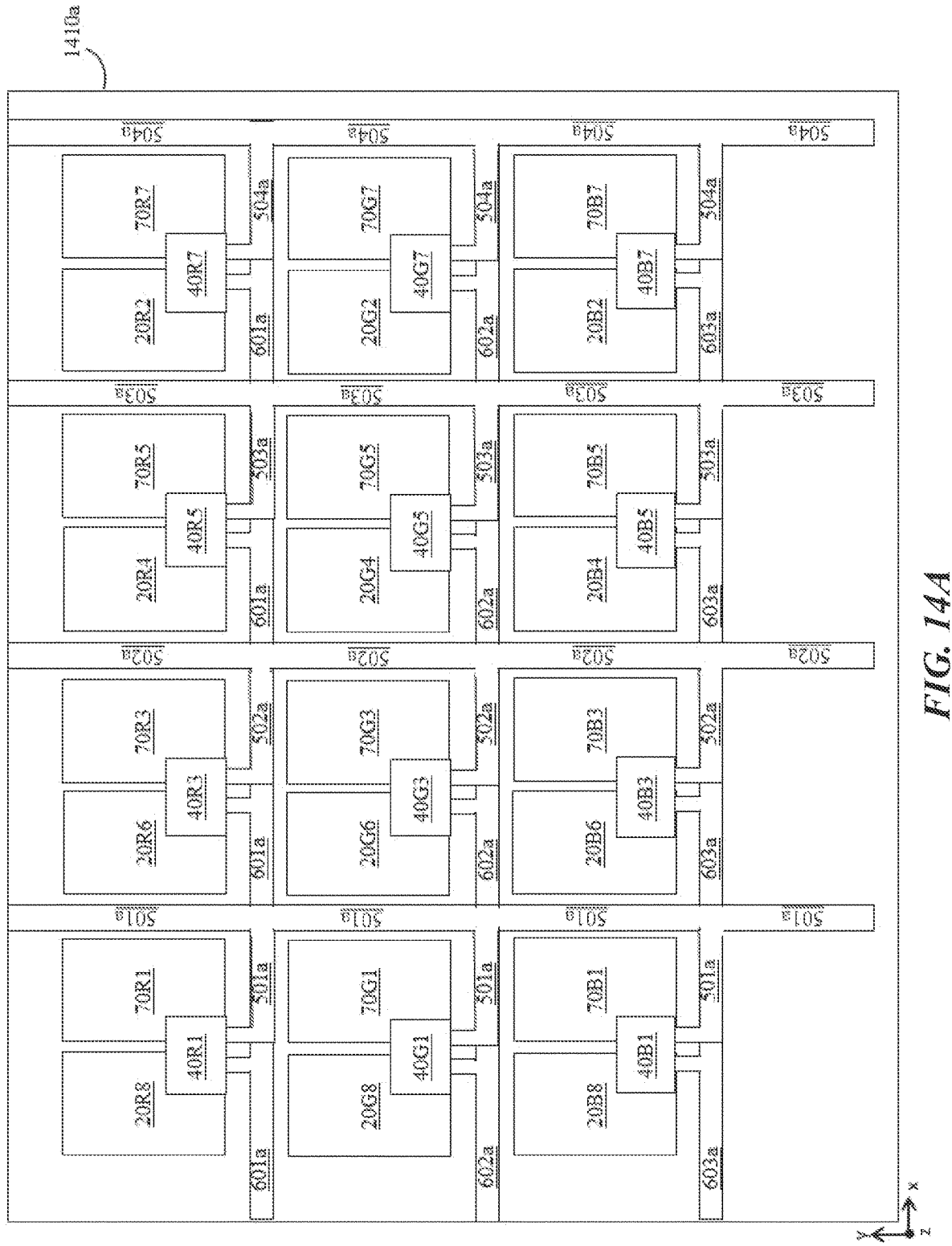
FIG. 14A illustrates a plan view of a first substrate having a TFT array, an array of drive electrodes and color filter array, and an array of pixel electrodes, in accordance with an example implementation of the present disclosure.
Figure 14B:
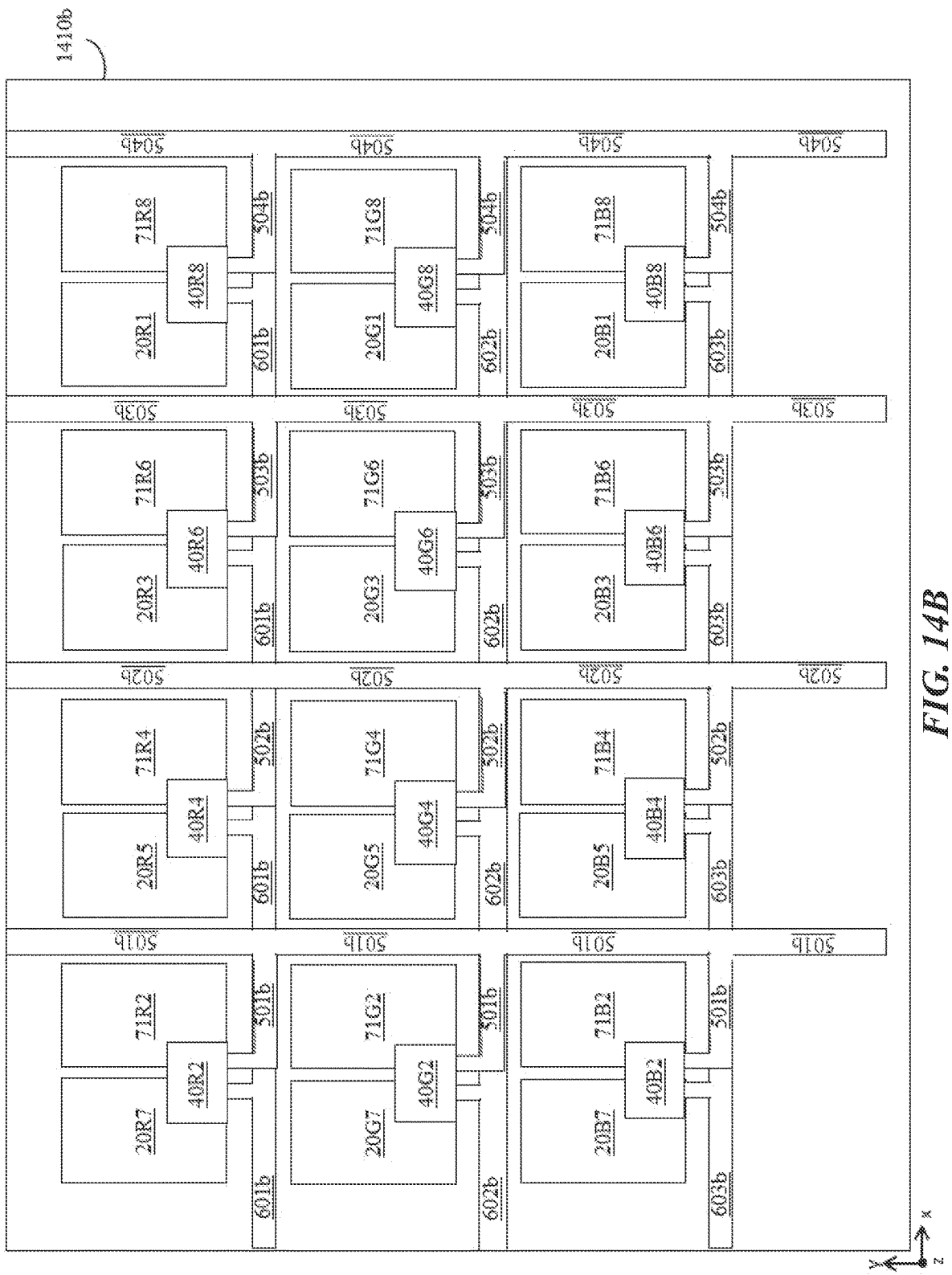
FIG. 14B illustrates a plan view of a second substrate having a TFT array, an array of drive electrodes and color filter array, and an array of pixel electrodes, in accordance with an example implementation of the present disclosure.
Figure 15A:
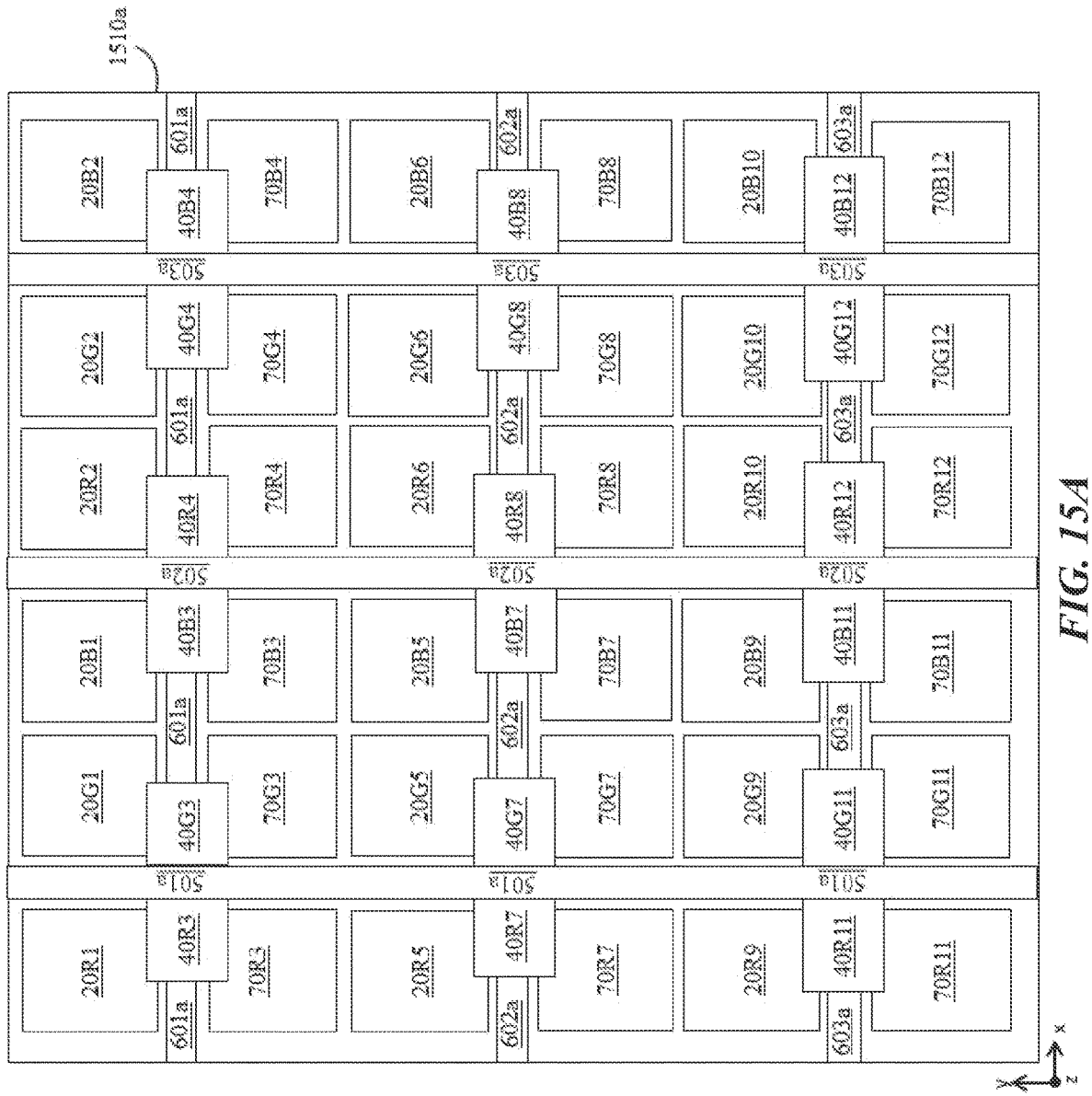
FIG. 15A illustrates a plan view of a first substrate having a TFT array, an array of drive electrodes and color filter array, and an array of pixel electrodes, in accordance with an example implementation of the present disclosure.
Figure 15B:
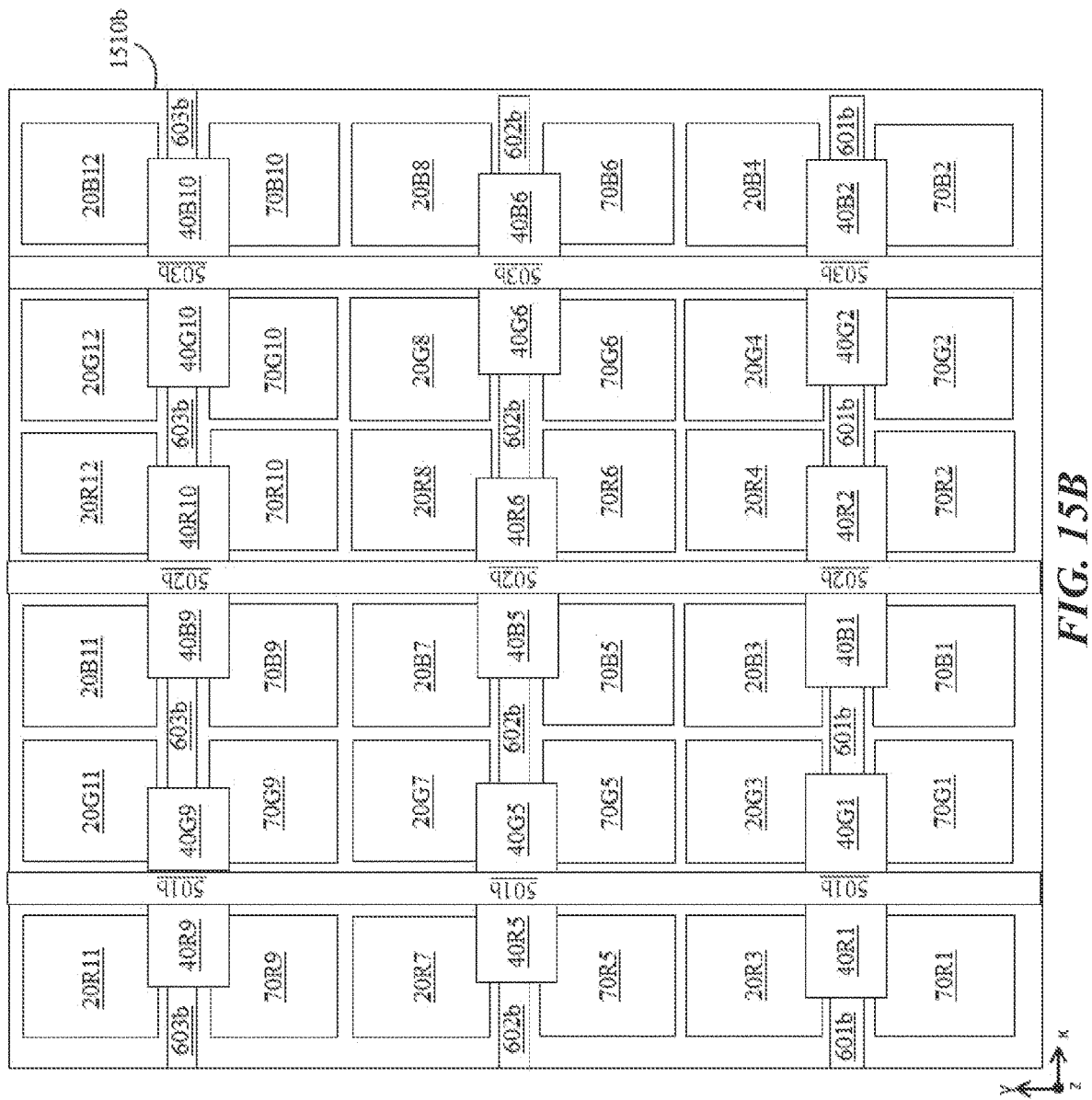
FIG. 15B illustrates a plan view of a second substrate having a TFT array, an array of drive electrodes and color filter array, and an array of pixel electrodes, in accordance with an example implementation of the present disclosure.

FIGS. 10A, 10B, and 10C describe how a novel LCD may be created using a first substrate and a second substrate wherein the first substrate is identical to the second substrate. FIGS. 11A, 11B, and 11C describe how another novel LCD may be created using a first substrate and a second substrate wherein the first substrate is identical to the second substrate. FIGS. 12A, 12B, and 12C describe how yet another novel LCD may be created using a first substrate and a second substrate wherein the first substrate is identical to the second substrate. FIGS. 13A and 13B describe how a novel monochrome LCD may be created using a first substrate and a second substrate wherein the first substrate is identical to the second substrate. FIGS. 14A and 14B describe how a novel color LCD may be created using a first substrate and a second substrate wherein the first substrate is identical to the second substrate. FIGS. 15A and 15B describe how another novel color LCD may be created using a first substrate and a second substrate wherein the first substrate is identical to the second substrate.

Referring to FIG. 10A, a plan view of a first substrate 1010a and a second substrate 1010b are shown wherein the first substrate 1010a is identical the second substrate 1010b. Both the first substrate 1010a and the second substrate 1010b have a TFT array (not shown) and an array of drive electrodes (not shown) as described previously in FIG. 5A through FIG. 9. Both the first substrate 1010a and the second substrate 1010b may have an array of color filters (not shown) as described previously in this disclosure. With reference to FIG. 10A, the TFT array, array of drive electrodes, and color filter array (if applicable) are disposed on the viewing side of the substrates 1010a and 1010b (e.g., on top of the substrate).

Referring to FIG. 10B, a perspective view of the first substrate 1010a and the second substrate 1010b are shown wherein the second substrate 1010b has been flipped along the y-axis and adhered to the top of the first substrate 1010a to form novel LCD 1013. Referring to FIG. 10C, a plan view of a novel LCD 1013 is shown that comprises the first substrate 1010a and the second substrate 1010b. The first substrate 1010a is obscured from view by the second substrate 1010b. Referring to FIGS. 10B and 10C, the TFT arrays, arrays of drive electrodes, and color filter arrays (if applicable) of the substrates 1010a and 1010b are disposed on the inner facing surfaces of the substrates, as shown previously in the disclosure, in FIGS. 5A, 6, 7, 8A, and FIG. 9.

Referring to FIGS. 10B and 10C, the TFT array (not shown) pertaining to the first substrate 1010a may at least partially overlap with the TFT array (not shown) pertaining to the second substrate 1010b (e.g., when the TFT arrays of the first substrate 1010a and the second substrate 1010b overlap, the TFT arrays have the same x and y positions but are separated from each other in the z-direction). With reference to FIGS. 10b and 10c, the array of drive electrodes (e.g., the row electrodes and the column electrodes) pertaining to the first substrate 1010a may at least partially overlap with the array of drive electrodes pertaining to the second substrate 1010b (e.g., when the array of drive electrodes pertaining to the first substrate 1010a and the array of drive electrodes pertaining to the second substrate 1010b overlap, the arrays of drive electrodes have the same x and y positions but are separated from each other in the z-direction).

A driver chip (not shown) may be bonded to the first substrate 1010a and/or a driver chip (not shown) may be bonded to the second substrate 1010b. A flexible printed circuit (FPC) cable may be bonded to the first substrate 1010a and/or a flexible printed circuit (FPC) cable may be bonded to the second substrate 1010b. The driver chip(s) (not shown) and/or the FPC cable(s) (not shown) may be conventional and are used with other conventional features (not shown) to enable each pixel (or sub-pixel) to modulate light according to the desired image.

Referring to FIG. 11A, a plan view of a first substrate 1110a and a second substrate 1110b are shown wherein the first substrate 1110a is identical the second substrate 1110b. Both the first substrate 1110a and the second substrate 1110b have a TFT array (not shown) and an array of drive electrodes (not shown) as described previously in this disclosure in FIG. 5A through FIG. 9. Both the first substrate 1110a and the second substrate 1110b may have an array of color filters (not shown) as described previously in this disclosure.

Referring to FIG. 11A, the TFT array, array of drive electrodes and color filter array (if applicable) are disposed on the viewing side of the substrates 1110a and 1110b (e.g., on top of the substrate). The first substrate 1110a includes a protruding edge 1111a and the second substrate 1110b includes a protruding edge 1111b. The protruding edges 1111a, 1111b are used for connecting external drive electronics to the array of drive electrodes pertaining to the first and second substrates 1110a, 1110b. A driver chip (not shown) may be bonded to each of the protruding edges 1111a, 1111b and/or a flexible printed circuit (FPC) cable may be bonded to each of the protruding edges 1111a, 1111b. The driver chips (not shown) and/or the FPC cables (not shown) may be conventional and are used with other conventional features (not shown) to enable each pixel (or sub-pixel) to modulate light according to the desired image.

Referring to FIG. 11B, a perspective view of a first substrate 1110a and a second substrate 1110b are shown wherein the second substrate 1110b has been flipped about the y-axis and adhered to the top of the first substrate 1110a to form novel LCD 1113. Referring to FIG. 11C, a plan view of novel LCD 1113 is shown that comprises the first substrate 1110a and the second substrate 1110b. With reference to FIG. 11C, the first substrate 1110a is obscured from view by the second substrate 1110b.

Referring to FIGS. 11B and 11C, the TFT arrays, arrays of drive electrodes, and color filter arrays (if applicable) of the substrates 1110a and 1110b are disposed on the inner facing surfaces of the substrates, as shown previously in FIGS. 5A, 6, 7, 8A, 9. Bonding external drive electronics to the protruding edges 1111a, 1111b may be performed after the first substrate 1110a and the second substrate 1110b have been adhered together.

Referring to FIGS. 11B and 11C, the TFT array (not shown) pertaining to the first substrate 1110a may at least partially overlap with the TFT array (not shown) pertaining to the second substrate 1110b (e.g., when the TFT arrays of the first substrate 1010a and the second substrate 1010b overlap, the TFT arrays have the same x and y positions but are separated from each other in the z-direction). Referring to FIGS. 11B and 11C, the array of drive electrodes (e.g. the row electrodes and the column electrodes) pertaining to the first substrate 1110a may at least partially overlap with the array of drive electrodes pertaining to the second substrate 1110b (e.g., when the array of drive electrodes pertaining to the first substrate 1110a and the array of drive electrodes pertaining to the second substrate 1110b overlap, the arrays of drive electrodes have the same x and y positions but are separated from each other in the z-direction).

Referring to FIG. 12A, a plan view of a first substrate 1210a and a second substrate 1210b are shown wherein the first substrate 1210a is identical the second substrate 1210b. Both the first substrate 1210a and the second substrate 1210b have a TFT array (not shown) and an array of drive electrodes (not shown) as described previously in FIG. 5A through FIG. 9. Both the first substrate 1210a and the second substrate 1210b may have an array of color filters (not shown) as described previously in this disclosure. Referring to FIG. 12A, the TFT array (not shown), array of drive electrodes (not shown), and color filter array (if applicable, not shown) are disposed on the viewing side of the substrates 1210a and 1210b (e.g., on top of the substrate).

The first substrate 1210a includes a protruding edge 1211a and the second substrate includes a protruding edge 1211b. The protruding edges 1211a, 1211b are used for connecting external drive electronics to the array of drive electrodes (not shown) pertaining to the first and second substrates 1210a, 1210b. A driver chip (not shown) may be bonded to each of the protruding edges 1211a, 1211b and/or a flexible printed circuit (FPC) cable may be bonded to each of the protruding edges 1211a, 1211b. The driver chips (not shown) and/or the FPC cables (not shown) may be conventional and are used with other conventional features (not shown) to enable each pixel (or sub-pixel) to modulate light according to the desired image.

Referring to FIG. 12B, a perspective view of a first substrate 1210a and a second substrate 1210b are shown wherein the second substrate 1210b has been flipped along the y-axis and rotated through 180° in the x-y-plane and then adhered to the top of first substrate 1210a to form a novel LCD 1213. Referring to FIG. 12C, a plan view of novel LCD 1213 is shown that comprises first substrate 1210a and second substrate 1210b. First substrate 1210a is obscured from view by second substrate 1210b. Referring to FIGS. 12B and 12C, the TFT arrays, arrays of drive electrodes, and color filter arrays (if applicable) of substrates 1210a and 1210b are disposed on the inner facing surfaces of the substrates, as shown previously in FIGS. 5A, 6, 7, 8A, and 9. Bonding external drive electronics to the protruding edges (1211a, 1211b) may be performed after the first substrate 1210a and the second substrate 1210b have been adhered together.

Referring to FIGS. 12B and 12C, the TFT array (not shown) pertaining to first substrate 1210a may at least partially overlap with the TFT array (not shown) pertaining to second substrate 1210b (e.g., when the TFT arrays of first substrate 1210a and second substrate 1210b overlap, the TFT arrays have the same x and y positions but are separated from each other in the z-direction). The array of drive electrodes (e.g., the row electrodes and the column electrodes) pertaining to first substrate 1210a may at least partially overlap with the array of drive electrodes pertaining to second substrate 1210b (e.g., when the array of drive electrodes pertaining to first substrate 1210a and the array of drive electrodes pertaining to second substrate 1210b overlap, the arrays of drive electrodes have the same x and y positions but are separated from each other in the z-direction).

Referring to FIG. 13A, a plan view of a first substrate 1310a is shown that is comprised a TFT array, an array of drive electrodes (e.g., an array of row electrodes and column electrodes), and an array of pixel electrodes. Specifically, the first substrate 1310a is comprised of three row electrodes (601a, 602a, and 603a), four column electrodes (501a, 502a, 503a, and 504a), twelve TFTs (40W1, 40W3, 40W5, 40W7, 40W9, 40W11, 40W13, 40W15, 40W17, 40W19, 40W21, and 40W23), and twelve sets of pixel electrodes (70W1, 70W3, 70W5, 70W7, 70W9, 70W11, 70W13, 70W15, 70W17, 70W19, 70W21, and 70W23).

Each TFT has a connection to a row electrode and a column electrode. For example, TFT 40W1 is connected to row electrode 601a and column electrode 501a. Each TFT is also connected to pixel electrodes in a conventional manner. For example, TFT 40W1 is connected to pixel electrodes 70W1, TFT 40W3 is connected to pixel electrodes 70W3, etc. The row electrodes are electrically isolated from the column electrodes using a conventional insulation layer (not shown). The conventional insulation layer enables the row electrodes and column electrodes to overlap in some areas on the first substrate 1310a (e.g., when the row and column electrodes overlap, they have the same x and y positions but are separated from each other by the insulation layer in the z-direction).

The first substrate 1310a has half the number of column electrodes compared with a conventional TFT substrate. Alternatively, the first substrate 1310a may be designed to have half the number of row electrodes compared with a conventional TFT substrate. The pixel electrodes may be IPS type electrodes as shown in FIGS. 8B and 8C, or the pixel electrodes may enable FFS electrodes as shown in FIGS. 8D and 8E. Alternatively, the pixel electrodes may enable a TN LCD or VAN type LCD or any other conventional LCD mode. The first substrate 1310a shown in FIG. 13A may be equivalent to the first substrate 1010a shown in FIGS. 10A through 10C. The first substrate 1310a shown in FIG. 13A may be equivalent to the first substrate 1110a shown in FIGS. 11A through 11C. The first substrate 1310a shown in FIG. 13A may be equivalent to the first substrate 1210a shown in FIGS. 12A through 12C.

Referring to FIG. 13B, a plan view of a second substrate 1310b is shown. The second substrate 1310b is identical to the first substrate 1310a shown in FIG. 13A. Although common features (such as row electrodes, column electrodes, TFTs, pixel electrodes, etc.) of the first substrate 1310a and second substrate 1310b are labeled differently, the first and second substrates 1310a, 1310b may be fabricated on the same production line. For example, the column electrode 501a shown in FIG. 13A is identical to the column electrode 501b shown in FIG. 13B; TFT 40W13 shown in FIG. 13A is identical to TFT 40W14 shown in FIG. 13B, etc. The second substrate 1310b shown in FIG. 13B may be equivalent to the second substrate 1010b shown in FIGS. 10A through 10C. The second substrate 1310b shown in FIG. 13B may be equivalent to the second substrate 1110b shown in FIGS. 11A through 11C. The second substrate 1310b shown in FIG. 13B may be equivalent to the second substrate 1210b shown in FIGS. 12A through 12C.

The first substrate 1310a shown in FIG. 13A may be combined with the identical second substrate 1310b so that a first white sub-pixel is comprised of the elements TFT 40W1 and pixel electrodes 70W1 and a second white sub-pixel is comprised of the elements TFT 40W2 and pixel electrodes 71W2. In general, a white pixel is comprised of TFT 40Wn and pixel electrodes XWn, where X=70 or 71 (70 for first substrate, 71 for second substrate), and n is a non-zero integer that indicates the pixel number. In general, the first substrate 1310a shown in FIG. 13A may be combined with the identical second substrate 1310b so that a white pixel is comprised of the elements TFT 40Wn and pixel electrodes 70Wn where n is a non-zero integer.

The first substrate 1310a shown in FIG. 13A may be combined with the identical second substrate 1310b shown in FIG. 13B to enable the novel LCD 1013 shown in FIGS. 10B and 10C. The first substrate 1310a shown in FIG. 13A may be combined with the identical second substrate 1310b shown in FIG. 13B to enable the novel LCD 1113 shown in FIGS. 11B and 11C. The first substrate 1310a shown in FIG. 13A may be combined with the identical second substrate 1310b shown in FIG. 13B to enable the novel LCD 1213 shown in FIGS. 12B and 12C. The novel LCD (1013, 1113, or 1213) that results from combining the first substrate 1310a shown in FIG. 13A with the identical second substrate 1310b shown in FIG. 13B has a total of 24 white pixels. It will be appreciated that the inventive concepts disclosed herein may be used to create a monochrome LCD comprised of many hundreds or many thousands of white pixels in each row and in each column.

Referring to FIG. 14A, a plan view of a first substrate 1410a is shown that comprises a TFT array, an array of drive electrodes (row electrodes and column electrodes), a color filter array, and an array of pixel electrodes. Specifically, the first substrate 1410a is comprised of three row electrodes (601a, 602a, and 603a), four column electrodes (501a, 502a, 503a, and 504a), twelve TFTs (40R1, 40R3, 40R5, 40R7, 40G1, 40G3, 40G5, 40G7, 40B1, 40B3, 40B5, and 40B7), twelve sets of pixel electrodes (70R1, 70R3, 70R5, 70R7, 70G1, 70G3, 70G5, 70G7, 70B1, 70B3, 70B5, and 70B7), and twelve color filters (20R2, 20R4, 20R6, 20R8, 20G2, 20G4, 20G6, 20G8, 20B2, 20B4, 20B6, and 20B8).

There are four identical red color filters (20R2, 20R4, 20R6, and 20R8), four identical green color filters (20G2, 20G4, 20G6, and 20G8), and four identical blue color filters (20B2, 20B4, 20B6, and 20B8). A white pixel is comprised of a red sub-pixel, a green sub-pixel, and a blue sub-pixel. For example, the red color filter area 20R8, green color filter area 20G8, and blue color filter area 20B8 may comprise a white pixel. Each TFT has a connection to a row electrode and a column electrode. For example, TFT 40R1 is connected to row electrode 601a and column electrode 501a. Each TFT is also connected to pixel electrodes, for example, TFT 40R1 is connected to pixel electrodes 70R1, TFT 40R3 is connected to pixel electrodes 70R3, etc.

The row electrodes are electrically isolated from the column electrodes using a conventional insulation layer (not shown). The conventional insulation layer enables the row electrodes and column electrodes to overlap in some areas on the substrate 1410a (e.g., when the row and column electrodes overlap, they have the same x and y positions but are separated from each other by the insulation layer in the z-direction). The pixel electrodes may be IPS type electrodes as shown in FIGS. 8B and 8C, or the pixel electrodes may enable FFS electrodes as shown in FIGS. 8D and 8E. Alternatively, the pixel electrodes may enable a TN LCD or VAN type LCD or any other conventional LCD mode. The first substrate 1410a shown in FIG. 14A may be equivalent to the first substrate 1010a shown in FIGS. 10A through 10C. The first substrate 1410a shown in FIG. 14A may be equivalent to the first substrate 1110a shown in FIGS. 11A through 11C. The first substrate 1410a shown in FIG. 14A may be equivalent to the first substrate 1210a shown in FIGS. 12A through 12C.

Referring to FIG. 14B, a plan view of a second substrate 1410b is shown. The second substrate 1410b is identical to the first substrate 1410a shown in FIG. 14A. Although common features (such as row electrodes, column electrodes, TFTs, pixel electrodes, color filters, etc.) of the first substrate 1410a and second substrate 1410b are labeled differently, the first and second substrates 1410a, 1410b may be fabricated on the same production line. For example, the column electrode 501a shown in FIG. 14A is identical to the column electrode 501b shown in FIG. 14B, TFT 40G5 shown in FIG. 14A is identical to ITT 40G6 shown in FIG. 14B, etc.

The second substrate 1410b shown in FIG. 14B may be equivalent to the second substrate 1010b shown in FIGS. 10A through 10C. The second substrate 1410b shown in FIG. 14B may be equivalent to the second substrate 1110b shown in FIG. 11A through 11C. The second substrate 1410b shown in FIG. 14B may be equivalent to the second substrate 1210b shown in FIGS. 12A through 12C.

The first substrate 1410a shown in FIG. 14A may be combined with the identical second substrate 1410b so that a first red sub-pixel is comprised of the elements TFT 40R1, pixel electrodes 70R1, and color filter 20R1. In general, the first substrate 1410a shown in FIG. 14A may be combined with the identical second substrate 1410b so that a color sub-pixel is comprised of the elements TFT 40Cn, pixel electrodes XCn and color filter 20Cn, where X is 70 or 71 (70 for first substrate, 71 for second substrate), C is R, G or B (representing red, green or blue respectively), and n is a non-zero integer that indicates the sub-pixel number.

The first substrate 1410a shown in FIG. 14A may be combined with the identical second substrate 1410b shown in FIG. 14B to enable the novel LCD 1013 shown in FIGS. 10B and 10C. The first substrate 1410a shown in FIG. 14A may be combined with the identical second substrate 1410b shown in FIG. 14B to enable the novel LCD 1113 shown in FIGS. 11B and 11C. The first substrate 1410a shown in FIG. 14A may be combined with the identical second substrate 1410b shown in FIG. 14B to enable the novel LCD 1213 shown in FIGS. 12B and 12C. The novel LCD (1013, 1113, or 1213) that results from combining the first substrate 1410a shown in FIG. 14A with the identical second substrate 1410b shown in FIG. 14B has a total of eight red sub-pixels, eight green sub-pixel, and eight blue sub-pixels. These red, green, and blue sub-pixels are combined into groups in a conventional manner to create eight white pixels. A white pixel may be square, or a white pixel may be rectangular. It will be appreciated that the inventive concepts disclosed herein may be used to create a color LCD comprised of many hundreds or many thousands of white pixels in each row and in each column.

Referring to FIG. 15A, a plan view of a first substrate 1510a is shown that is comprised a TFT array, an array of drive electrodes (row electrodes and column electrodes), a color filter array, and an array of pixel electrodes. Specifically, the first substrate 1510a is comprised of three row electrodes (601a, 602a, and 603a) and three column electrodes (501a, 502a, and 503a), eighteen TFTs (40R3, 40G3, 40B3, 40R4, 40G4, 40B4, 40R7, 40G7, 40B7, 40R8, 40G8, 40B8, 40R11, 40G11, 40B11, 40R12, 40G12, and 40B12), eighteen sets of pixel electrodes (70R3, 70G3, 70B3, 70R4, 70G4, 70B4, 70R7, 70G7, 70B7, 70R8, 70G8, 70B8, 70R11, 70G11, 70B11, 70R12, 70G12, and 70B12), and eighteen color filters (20R1, 20G1, 20B1, 20R2, 20G2, 20B2, 20R5, 20G5, 20B5, 20R6, 20G6, 20B6, 20R9, 20G9, 20B9, 20R10, 20G10, and 20B10).

There are six identical red color filters (20R1, 20R2, 20R5, 20R6, 20R9, and 20R10). There are six identical green color filters (20G1, 20G2, 20G5, 20G6, 20G9, and 20G10). There are six identical blue color filters (20B1, 20B2, 20B5, 20B6, 20B9, and 20B10). A white pixel is comprised of a red sub-pixel, a green sub-pixel, and a blue sub-pixel. For example, the red color filter area 20R1, green color filter area 20G1, and blue color filter area 20B1 may comprise a white pixel.

All TFTs shown on the first substrate 1510a have a connection (not shown) to a row electrode pertaining to the first substrate 1510a. Unconventionally, 50% of the TFTs shown on the first substrate 1510a are connected to a column electrode pertaining to first substrate 1510a while the other 50% of the TFTs shown on the first substrate 1510a are connected to a column electrode pertaining to the second substrate 1510b that is shown in FIG. 15B. One skilled in the art of LCDs will appreciate that it is unconventional to connect TFTs pertaining to the first substrate 1510a to drive electrodes pertaining to the second substrate 1510b. TFTs pertaining to the first substrate 1510a that are connected to a column electrode of the second substrate 1510b are connected using a conductive pillar or similar object (not shown) that propagates in the z-direction and traverses the space between the first substrate 1510a and the second substrate 1510b. The conductive pillar (or similar) may also be used to maintain the correct spacing between the first substrate 1510a and the second substrate 1510b.

Each TFT is also connected to pixel electrodes. For example, TFT 40R3 is connected to pixel electrodes 70R3, TFT 40G3 is connected to pixel electrodes 70G3, etc. The row electrodes are electrically isolated from the column electrodes using a conventional insulation layer (not shown). The conventional insulation layer enables the row electrodes and column electrodes to overlap in some areas on the substrate 1510a (e.g., when the row and column electrodes overlap, they have the same x and y positions but are separated from each other by the insulation layer in the z-direction). The pixel electrodes may be IPS type electrodes as shown in FIGS. 8B and 8C, or the pixel electrodes may be FFS type electrodes as shown in FIGS. 8D and 8E. Alternatively, the pixel electrodes may enable a TN LCD or VAN type LCD or any other conventional LCD mode. The first substrate 1510a shown in FIG. 15A may be equivalent to the first substrate 1010a shown in FIGS. 10A through 10C. The first substrate 1510a shown in FIG. 15A may be equivalent to the first substrate 1110a shown in FIGS. 11A through 11C. The first substrate 1510a shown in FIG. 15A may be equivalent to the first substrate 1210a shown in FIGS. 12A through 12C.

Referring to FIG. 15B, a plan view of a second substrate 1510b is shown. The second substrate 1510b is identical to the first substrate 1510a shown in FIG. 15A. Although common features (such as row electrodes, column electrodes, TFTs, pixel electrodes, color filters, etc.) of the first substrate 1510a and second substrate 1510b are labeled differently, the first and second substrates 1510a, 1510b may be fabricated on the same production line. For example, the column electrode 501a shown in FIG. 15A is identical to the column electrode 501b shown in FIG. 15B; TFT 40R3 shown in FIG. 15A is identical to ITT 40R9 shown in FIG. 15B, etc. The second substrate 1510b shown in FIG. 15B may be equivalent to the second substrate 1010b shown in FIGS. 10A through 10C. The second substrate 1510b shown in FIG. 15B may be equivalent to the second substrate 1110b shown in FIGS. 11A through 11C. The second substrate 1510b shown in FIG. 15B may be equivalent to the second substrate 1210b shown in FIGS. 12A through 12C.

All TFTs shown on the second substrate 1510b have a connection (not shown) to a row electrode pertaining to the second substrate 1510b. Unconventionally, 50% of the TFTs shown on the second substrate 1510b are connected to a column electrode pertaining to second substrate 1510b while the other 50% of the TFTs shown on the second substrate 1510b are connected to a column electrode pertaining to the first substrate 1510a that is shown in FIG. 15A. One skilled in the art of LCDs will appreciate that it is unconventional to connect TFTs pertaining to the second substrate 1510b to drive electrodes pertaining to the first substrate 1510a. TFTs pertaining to the second substrate 1510b that are connected to a column electrode of the first substrate 1510a are connected using a conductive pillar or similar object (not shown) that propagates in the z-direction and traverses the space between the first substrate 1510a and the second substrate 1510b. The conductive pillar (or similar object) may also be used to maintain the correct spacing between the first substrate 1510a and the second substrate 1510b.

The first substrate 1510a shown in FIG. 15A may be combined with the identical second substrate 1510b to enable a novel LCD. As mentioned previously, 50% of the TFTs pertaining to the first substrate 1510a are electrically connected to column electrodes pertaining to the second substrate 1510b, and 50% of the TFTs pertaining to the second substrate 1510b are electrically connected to column electrodes pertaining to the first substrate 1510a in the manner illustrated in either FIG. 5E or FIG. 5F. Each TFT pertaining to the first substrate 1510a is connected to a row electrode and a column electrode wherein the row electrode pertains to the first substrate 1510a and the column electrode pertains to either the first substrate 1510a or the second substrate 1510b. Each TFT pertaining to the second substrate 1510b is connected to a row electrode and a column electrode wherein said row electrode pertains to the second substrate 1510b and said column electrode pertains to either the first substrate 1510a or the second substrate 1510b.

Figure 15C:
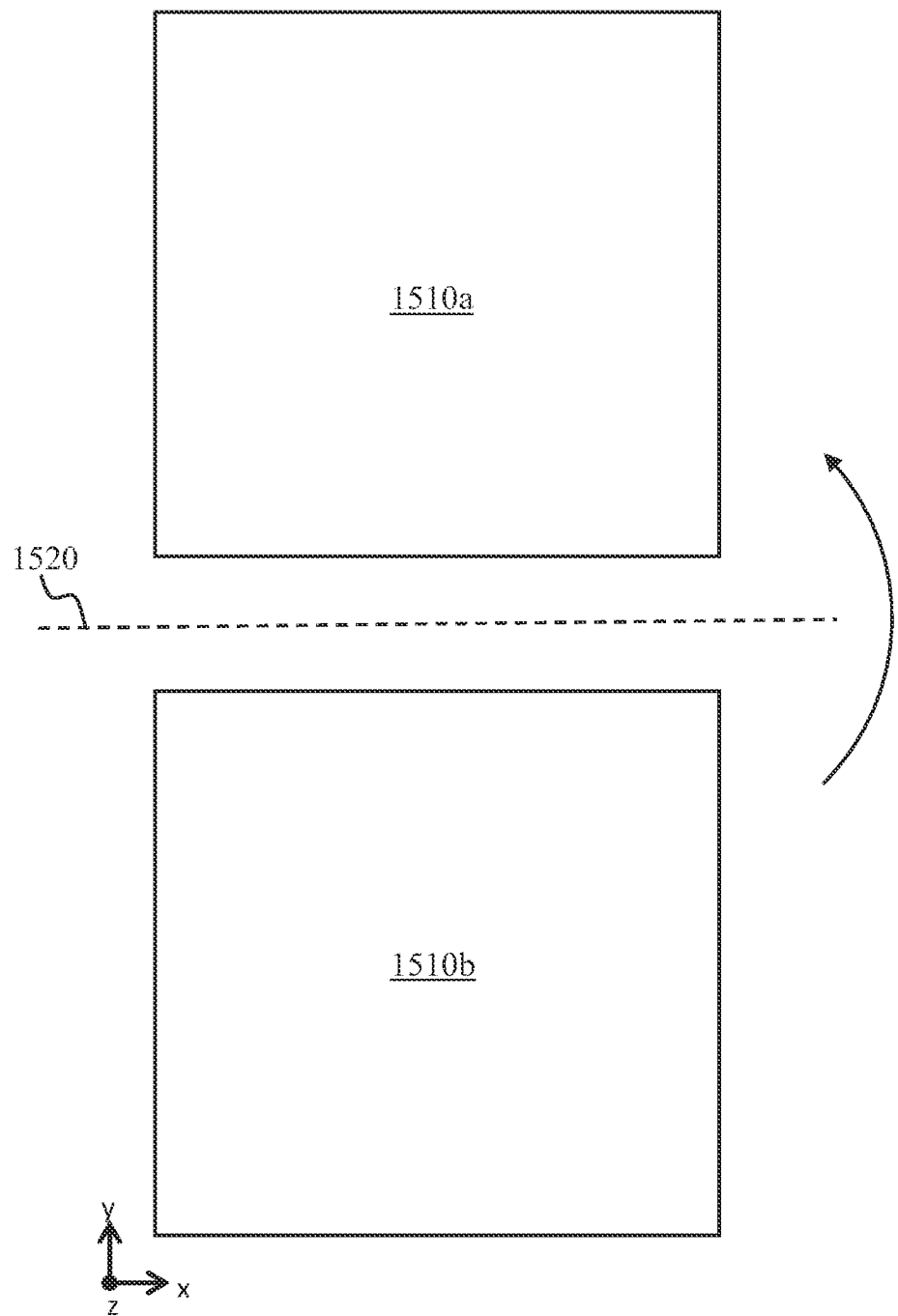
FIG. 15C illustrates a plan view of the first substrate and the second substrate oriented about an aligning axis, whereby the second substrate is flipped onto the first substrate, in accordance with an example implementation of the present disclosure.
Figure 15D:
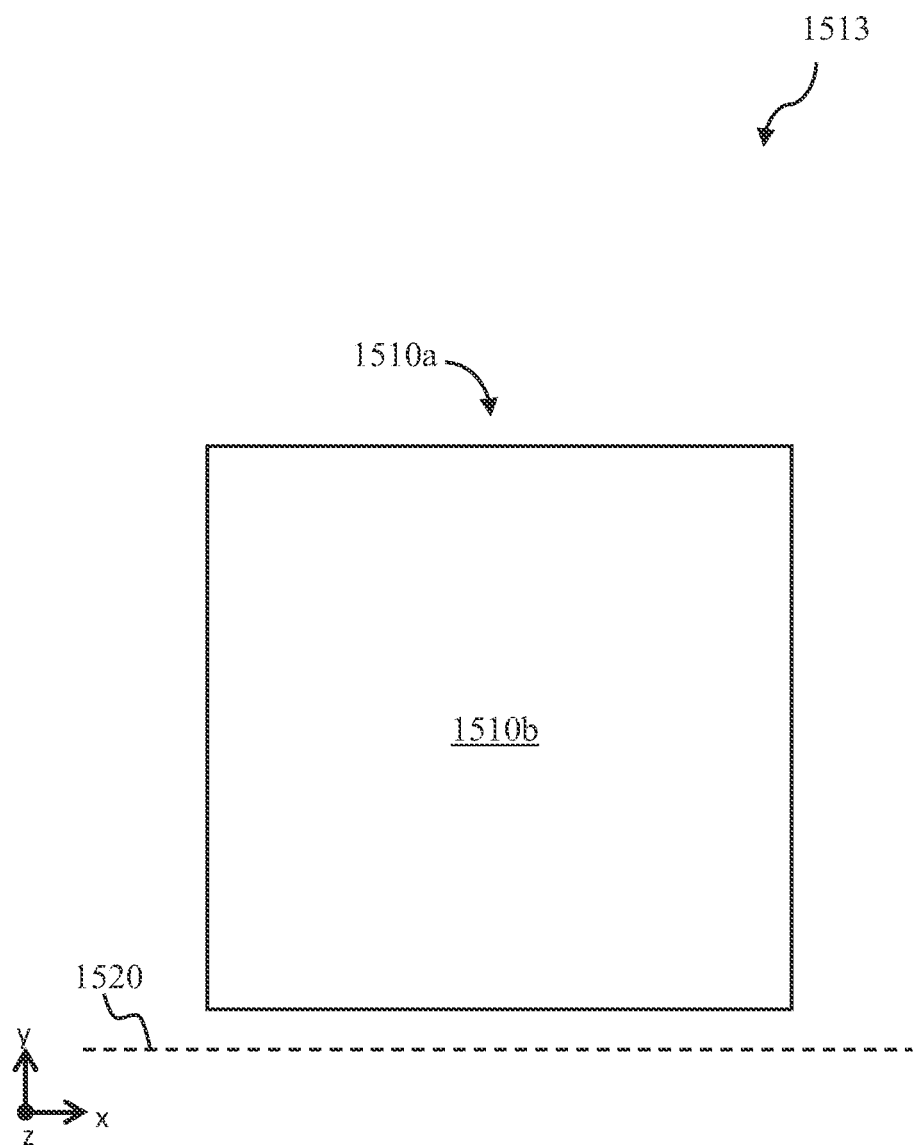
FIG. 15D illustrates a plan view of the second substrate having been aligned and flipped over and onto the first substrate, in accordance with an example implementation of the present disclosure.

FIGS. 15A, 15B, 15C, 15D and 15E illustrate how an example LCD 1513 (FIG. 15D) may be constructed by combining the first substrate 1510a with the second substrate 1510b. Referring to FIG. 15C, a simplified view of the first substrate 1510a of FIG. 15A and the second substrate 1510b of FIG. 15B is shown. The first substrate 1510a and the second substrate 1510b (oriented as shown in FIGS. 15A and 15B, respectively) are aligned about an axis 1520. In order to construct the example LCD 1513 shown in FIG. 15D, the second substrate 1510b is flipped vertically, end over end, about the axis 1520 so that the second substrate 1510b is placed on top of the first substrate 1510a. Construction of example LCD 1513 in this manner means that the TFT 40R1 of FIG. 15B at least partially overlaps TFT

40R3 of FIG. 15A from a viewing perspective, and row electrode 601b of FIG. 15B at least partially overlaps row electrode 601a of FIG. 15A from a viewing perspective. In alternative implementations, the first substrate 1510a may be flipped about the axis 1520 so that the first substrate 1510a is placed on top of the second substrate 1510b, in which case the coverage would be reversed. All row electrodes (601a, 601b, 602a, 602b, 603a and 603b) are connected to the gate terminals of the TFTs and in accordance with either FIG. 5E or FIG. 5F. All column electrodes (501a, 501b, 502a, 502b, 503a and 503b) are connected to the source terminals of the TFTs and in accordance with either FIG. 5E or FIG. 5F.

As is conventional, application of a sufficient voltage to the gate electrode of a TFT activates said TFT so that the correct image data signals can be applied to a pixel electrode via a combination of the source electrode of said TFT and an associated storage capacitor (not shown). FIG. 15E illustrates which TFT is connected to which row electrode and which column electrode of FIGS. 15A and 15B. FIG. 15F is an alternative arrangement of connections for TFTs, row electrodes and column electrodes to that shown in FIG. 15E. One skilled in the art of displays will realize a great many variations similar to FIG. 15E and FIG. 15F exist. With reference to FIG. 15E, TFT 40R1 is connected to row electrode 601b and column electrode 501b. TFT 40R1, row electrode 601b and column electrode 501b are all located on the second substrate 1510b, and therefore the row and column electrode connections to TFT 40R1 can be made in a conventional manner. However, also with reference to FIG. 15E, TFT 40G1 is connected to row electrode 601b and column electrode 501a. Although TFT 40G1 and row electrode 601b are both located on the second substrate 1510b, column electrode 501a is located on the first substrate 1510a. Since TFT 40G1 and column electrode 501a are located on opposing substrates (1510b and 1510a, respectively), the column electrode 501a is connected to the TFT 40G1 via a conductive pillar or similar object (not shown) that propagates in the z-direction and traverses the space between the first substrate 1510a and the second substrate 1510b. With reference to FIG. 15E, 50% of TFTs are connected to a column electrode that pertains to the same substrate as the TFT while the remaining TFTs are connected to a column electrode that pertains to the opposing substrate. With reference to FIGS. 15A, 15B, 15C, 15D and 15E, a first column of TFTs (for example, 40R3, 40R7 and 40R11) are connected to a column electrode that pertains to the same substrate as the first column of TFTs while a second column of sub-pixels (for example, 40G3, 40G7 and 40G11), that is both adjacent to the first column of sub-pixels and pertains to the same substrate as the first column of TFTs, are connected to a column electrode that pertains to the opposite substrate to the second column of TFTs.

With reference to FIGS. 15A, 15B, 15C, 15D and 15F, a first TFT in a first column is connected to a column electrode that pertains to the same substrate as the first TFT while a second TFT in the first column, that is both adjacent to the first TFT and pertains to the same substrate as the first TFT, is connected to a column electrode that pertains to the opposite substrate to the second TFT. In the alternative connection arrangement for TFTs, row electrodes and column electrode shown in FIG. 15F, TFTs that are connected to column electrodes that pertain to the same substrate as said TFTs form an arrangement that is similar to a first checkerboard pattern. Likewise, TFTs that are connected to column electrodes that pertain to the opposite substrate to said TFTs form an arrangement that is similar to a second checkerboard pattern. The first and second checkerboard patterns are interdigitated and these checkerboard patterns may be square or rectangular.

With reference to FIG. 15E and FIG. 15F, a first TFT in a first row of TFTs is connected to a column electrode that pertains to the same substrate as the first TFT while a second TFT, that is in the first row and adjacent to the first TFT, is connected to a column electrode that pertains to the opposite substrate to the second TFT, wherein the first and second TFTs pertain to the same substrate.

Still referring to FIGS. 15A, 15B, 15C, 15D and 15E, an example electrical drive method (e.g., addressing) for the novel LCD 1513 will now be described. The unconventional aspect of the electrical drive method described herein arises from the fact that both the first substrate 1510a and the second substrate 1510b are populated with TFTs and drive electrodes. One skilled in the art of LCDs will appreciate that when addressing an LCD of conventional design, row electrodes do not have the overlapping feature as described herein. One skilled in the art of LCDs will therefore appreciate that most aspects of the following electrical drive method are conventional, and it is the arrangement of the TFTs and drive electrodes that is unconventional.

For example, an electrical signal may be applied to row electrode 601b, thus activating the following TFTs in a conventional manner: 40R1, 40G1, 40B1, 40R2, 40G2 and 40B2. The appropriate image data signals are then applied to all column electrodes (501a, 501b, 502a, 502b, 503a and 503b) in a conventional manner so that a storage capacitor (not shown) that is associated with each sub-pixel is charged via the source connection on the associated TFT enabling the correct voltage to be applied to the associated pixel electrode, thus enabling the desired light modulation of said sub-pixel in the pre-determined conventional manner. The electrical signal is then removed from the row electrode 601b, thus isolating the following TFTs in a conventional manner: 40R1, 40G1, 40B1, 40R2, 40G2 and 40B2. An electrical signal is then applied to row electrode 601a, thus activating the following TFTs in a conventional manner: 40R3, 40G3, 40B3, 40R4, 40G4 and 40B4. The appropriate image data signals are then applied to all column electrodes (501a, 501b, 502a, 502b, 503a and 503b) in a conventional manner so that sub-pixels associated with TFTs 40R3, 40G3, 40B3, 40R4, 40G4 and 40B4 modulate light in the pre-determined conventional manner. The electrical signal is removed from the row electrode 601a, thus isolating the following TFTs in a conventional manner: 40R3, 40G3, 40B3, 40R4, 40G4 and 40B4. This electrical driving process is then repeated for each row electrode of the LCD 1513 so that each sub-pixel of the LCD 1513 modulates light in the pre-determined manner to render a desired image.

When the last row of sub-pixels has been addressed, addressing of the next image commences from the first row of sub-pixels, thus repeating the addressing process. In this addressing example, the image is formed by alternately addressing rows pertaining to the first substrate 1510a and the second substrate 1510b. In other words, the image is formed by addressing sequential rows of sub-pixels pertaining to the LCD 1513. Those skilled in the art of displays will recognize this method of addressing to be progressive scanning (also known as non-interlaced scanning). Alternatively, the image may be formed by, firstly, addressing all the rows of sub-pixels pertaining to the first substrate 1510a in a sequential fashion and then, secondly, addressing all the rows of sub-pixels pertaining to the second substrate 1510b in a sequential fashion. In this alternative addressing method, sub-pixels located on odd rows of the LCD 1513 will be addressed first and then sub-pixels located on even rows of the LCD 1513 will be addressed second. Those skilled in the art of displays will recognize this alternative method of addressing to be interlaced scanning.

The first substrate 1510a shown in FIG. 15A may be combined with the identical second substrate 1510b shown in FIG. 15B so that a first red sub-pixel is comprised of the elements TFT 40R1, pixel electrodes 70R1, and color filter 20R1. In general, the first substrate 1510a shown in FIG. 15A may be combined with the identical second substrate 1510b shown in FIG. 15B so that a color sub-pixel is comprised of the elements: TFT 40Cn, pixel electrodes 70Cn, and color filter 20Cn, where C is R, G, or B (representing red, green, or blue respectively) and n is a non-zero integer that indicates the sub-pixel number.

The first substrate 1510a shown in FIG. 15A may be combined with the identical second substrate 1510b shown in FIG. 15B to enable the novel LCD 1013 shown in FIGS. 10B and 10C. The first substrate 1510a shown in FIG. 15A may be combined with the identical second substrate 1510b shown in FIG. 15B to enable the novel LCD 1113 shown in FIGS. 11B and 11C. The first substrate 1510a shown in FIG. 15A may be combined with the identical second substrate 1510b shown in FIG. 15B to enable the novel LCD 1213 shown in FIGS. 12B and 12C. The novel LCD (1013, 1113, 1213 or 1513) that results from combining the first substrate 1510a shown in FIG. 15A with the identical second substrate 1510b shown in FIG. 15B has a total of twelve red sub-pixels, twelve green sub-pixels, and twelve blue sub-pixels. These red, green, and blue sub-pixels are combined into groups in a conventional manner to create twelve white pixels. A white pixel may be square, or a white pixel may be rectangular. It will be appreciated that the inventive concepts disclosed herein may be used to create a color LCD comprised of many hundreds or many thousands of white pixels in each row and in each column.

A novel LCD comprised of substrates 1410a and 1410b may have a simpler manufacturing process than a novel LCD comprised of substrates 1510a and 1510b and thus a novel LCD comprised of substrates 1410a and 1410b may have a reduced cost. A novel LCD comprised of substrates 1510a and 1510b may have fewer row electrodes than a novel LCD comprised of substrates 1410a and 1410b, and thus a novel LCD comprised of substrates 1510a and 1510b may have an improved pixel to aperture ratio (e.g., the pixel area associated with light modulation has been increased and therefore the transmission efficiency has been increased). Improving the transmission efficiency of an LCD enables a brighter image and/or a lower power consumption. Improving image brightness and/or reducing power consumption may be an application specific design choice.

Implementations of the present disclosure may improve the transmission efficiency of LCDs (i.e., improve the transmission efficiency of an LCD image panel), enabling enhanced brightness and/or low power consumption. Such LCDs may include mobile phones including smartphones, personal digital assistants (PDAs), tablets, laptop computers, televisions, public information displays, etc. Improving the transmission efficiency of an LCD image panel may also benefit camera-under-display applications since more optical light and/or more infra-red light may be incident on a camera(s) that is located beneath the image panel of the LCD.

What is claimed is:

1. An LCD apparatus having a first substrate and a second substrate, the LCD apparatus comprising:
a first TFT array deposited on the first substrate;
a first array of drive electrodes deposited on the first substrate;
a second TFT array deposited on the second substrate; and
a second array of drive electrodes deposited on the second substrate;
wherein the first TFT array, the second TFT array, the first array of drive electrodes and the second array of drive electrodes are configured to enable pixels or sub-pixels of the LCD apparatus to modulate light,
at least one electrode of the first array of drive electrodes is connected to at least one TFT of the first TFT array and at least one TFT of the second TFT array, and
at least one electrode of the second array of drive electrodes is connected to at least one TFT of the first TFT array and at least one TFT of the second TFT array.

2. The LCD apparatus of claim 1, wherein the first TFT array at least partially overlaps the second TFT array from an LCD viewing perspective.

3. The LCD apparatus of claim 1, wherein the first array of drive electrodes at least partially overlaps the second array of drive electrodes from an LCD viewing perspective.

4. The LCD apparatus of claim 1, further comprising a first color filter array deposited on one of the first substrate and the second substrate.

5. The LCD apparatus of claim 1, further comprising a first color filter array deposited on the first substrate and a second color filter array deposited on the second substrate.

6. The LCD apparatus of claim 5, wherein the first color filter array and the second color filter array each have at least one color filter selected from the group consisting of a red color filter, a green color filter, and a blue color filter.

7. The LCD apparatus of claim 5, wherein at least one color filter of the first color filter array at least partially overlaps at least one color filter of the second color filter array having the same color, from an LCD viewing perspective.

8. The LCD apparatus of claim 1, further comprising a patterned black mask array deposited on one of the first substrate and the second substrate.

9. The LCD apparatus of claim 1, further comprising a patterned black mask array deposited on both the first substrate and the second substrate.

10. The LCD apparatus of claim 1, wherein an LC mode of the LCD apparatus is configured to be a type selected from the group consisting of a fringe field switching type, an in-plane switching type, a vertically aligned type, a twisted nematic type, and an LC scattering type.

11. The LCD apparatus of claim 1, further comprising pixel electrodes deposited on one of the first substrate and the second substrate.

12. The LCD apparatus of claim 1, further comprising pixel electrodes deposited on both the first substrate and the second substrate.

13. The LCD apparatus of claim 1, further comprising pixel electrodes, the pixel electrodes being disposed above or below a color filter layer.

14. The LCD apparatus of claim 1, wherein the LCD apparatus is configured to be of a type selected from the group consisting of transmissive LCD, reflective LCD, transflective LCD, and transparent LCD.

15. The LCD apparatus of claim 1, wherein the first TFT array is identical to the second TFT array.

16. The LCD apparatus of claim 1, wherein the first array of drive electrodes is identical to the second array of drive electrodes.

17. The LCD apparatus of claim 1, wherein at least one of a driver chip and an FPC are bonded to the first substrate.

18. The LCD apparatus of claim 1, wherein at least one of a driver chip and an FPC are bonded to the second substrate.

19. The LCD apparatus of claim 1, wherein the first TFT array is identical to the second TFT array and the first array of drive electrodes is identical to the second array of drive electrodes.

20. An LCD apparatus having a first substrate and a second substrate, the LCD apparatus comprising:
a first TFT array deposited on the first substrate;
a first array of drive electrodes deposited on the first substrate;
a second TFT array deposited on the second substrate; and
a second array of drive electrodes deposited on the second substrate;
wherein the first TFT array, the second TFT array, the first array of drive electrodes and the second array of drive electrodes are configured to enable pixels or sub-pixels of the LCD apparatus to modulate light, and
in a direction from the first substrate toward the second substrate, the first substrate is a substrate positioned at a farthest one-side with respect to the first TFT array, the second substrate is a substrate positioned at a farthest another-side with respect to the first TFT array, and, only one liquid crystal layer is provided between the first substrate and the second substrate.

21. The LCD apparatus of claim 20, wherein no polarizer is formed between the first substrate and the second substrate.

22. The LCD apparatus of claim 20, wherein the first TFT array at least partially overlaps the second TFT array from an LCD viewing perspective.

23. The LCD apparatus of claim 20, wherein the first array of drive electrodes at least partially overlaps the second array of drive electrodes from an LCD viewing perspective.

24. The LCD apparatus of claim 20, further comprising a patterned black mask array deposited on one of the first substrate and the second substrate.

25. The LCD apparatus of claim 20, further comprising pixel electrodes deposited on one of the first substrate and the second substrate.

26. The LCD apparatus of claim 20, wherein at least one electrode of the first array of drive electrodes is connected to at least one TFT of the first TFT array and at least one TFT of the second TFT array; and
wherein at least one electrode of the second array of drive electrodes is connected to at least one TFT of the first TFT array and at least one TFT of the second TFT array.

\* \* \* \* \*